United States Patent
Johnson et al.

(10) Patent No.: US 11,649,616 B2
(45) Date of Patent: May 16, 2023

(54) FLUID DELIVERY SYSTEM

(71) Applicant: Banyan Water, Inc., Austin, TX (US)

(72) Inventors: Robert B. Johnson, Austin, TX (US);
Justin E. Manuel, Austin, TX (US);
Gillan A. Taddune, Austin, TX (US);
David M. Bradham, Austin, TX (US)

(73) Assignee: Banyan Water, Inc., Austin, TX (US)

(*) Notice: Subject to any disclaimer, the term of this patent is extended or adjusted under 35 U.S.C. 154(b) by 284 days.

(21) Appl. No.: 17/093,317

(22) Filed: Nov. 9, 2020

(65) Prior Publication Data
US 2021/0140151 A1 May 13, 2021

Related U.S. Application Data

(60) Provisional application No. 62/934,138, filed on Nov. 12, 2019.

(51) Int. Cl.
*E03B 7/00* (2006.01)
*E03B 7/07* (2006.01)
*G01M 3/28* (2006.01)

(52) U.S. Cl.
CPC .......... *E03B 7/003* (2013.01); *E03B 7/07* (2013.01); *E03B 7/071* (2013.01); *G01M 3/2807* (2013.01); *Y02A 20/15* (2018.01)

(58) Field of Classification Search
CPC .......... E03B 7/003; E03B 7/07; E03B 7/071; G01M 3/2807; Y02A 20/15
USPC ............................................. 137/15.1, 487.5
See application file for complete search history.

(56) References Cited

U.S. PATENT DOCUMENTS

| | | | |
|---|---|---|---|
| 5,409,037 A * | 4/1995 | Wheeler | G01M 3/243 137/551 |
| 5,927,603 A | 7/1999 | McNabb | |
| 6,209,576 B1 * | 4/2001 | Davis | G05D 7/0635 137/460 |
| 6,237,618 B1 * | 5/2001 | Kushner | E03B 7/071 137/1 |
| 6,708,722 B1 * | 3/2004 | Goodenough | E03B 7/071 137/460 |
| 7,957,843 B2 | 6/2011 | Sacks | |
| 8,793,024 B1 | 7/2014 | Woytowitz et al. | |
| 10,526,771 B1 * | 1/2020 | Devereaux | E03B 7/003 |
| 2005/0126635 A1 * | 6/2005 | Addink | G05D 7/0635 137/487.5 |
| 2006/0048821 A1 * | 3/2006 | Fenton | G01M 3/2807 137/460 |
| 2011/0073189 A1 * | 3/2011 | Elbert | E03B 7/071 137/1 |
| 2011/0114202 A1 * | 5/2011 | Goseco | E03B 7/04 137/487.5 |
| 2014/0236868 A1 * | 8/2014 | Cook | A01G 25/16 705/412 |

(Continued)

*Primary Examiner* — Minh Q Le
(74) *Attorney, Agent, or Firm* — Zagorin Cave LLP

(57) ABSTRACT

Techniques for managing delivery of water or other fluids have been disclosed. A central server provides real-time data and cost analysis to a client. In addition, fluid delivery techniques provide alerts or automatic schedule suspensions to reduce risk of loss. The techniques reduce or eliminate the impact of air or gas captured with water or other fluid of a fluid delivery system. The techniques allow a preexisting fluid delivery system to be retrofitted to communicate with a central system and one or more sensors of a fluid delivery system.

18 Claims, 12 Drawing Sheets

(56) References Cited

U.S. PATENT DOCUMENTS

| | | | | |
|---|---|---|---|---|
| 2014/0238511 | A1* | 8/2014 | Klicpera | F16K 31/05 137/551 |
| 2016/0376773 | A1* | 12/2016 | Abuhamdeh | G01M 3/18 73/40.5 R |
| 2018/0127957 | A1* | 5/2018 | Enev | G01M 3/2815 |
| 2018/0275011 | A1* | 9/2018 | Saidi | G01M 3/2807 |
| 2019/0063689 | A1* | 2/2019 | Liu | G01M 3/2815 |
| 2019/0281371 | A1* | 9/2019 | Klicpera | H04Q 9/00 |
| 2019/0323919 | A1* | 10/2019 | Fung-A Wing | G08B 21/20 |
| 2020/0340220 | A1* | 10/2020 | Bailey | G01M 3/3272 |
| 2021/0018393 | A1* | 1/2021 | Downey | G16Y 40/35 |
| 2021/0079630 | A1* | 3/2021 | Poojary | E03B 1/041 |
| 2021/0215568 | A1* | 7/2021 | Hori | E03B 7/003 |

\* cited by examiner

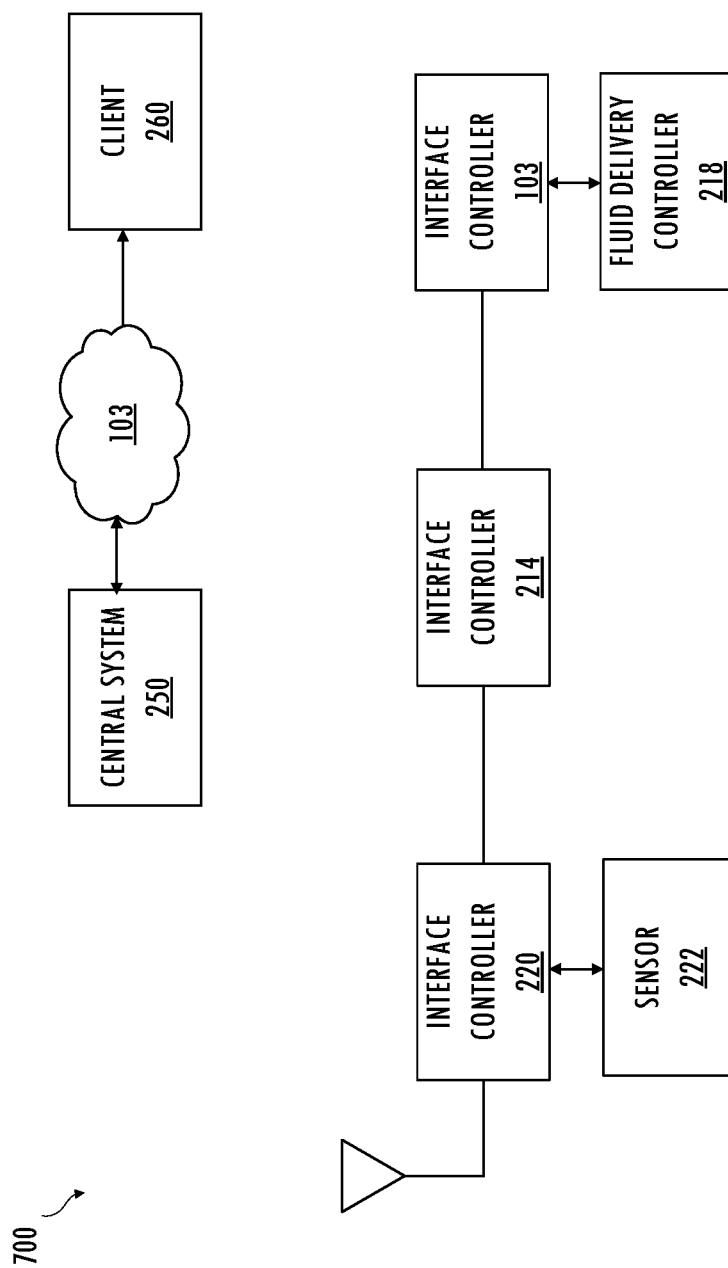

FLUID DELIVERY SYSTEM

CROSS-REFERENCE TO RELATED APPLICATION(S)

This application claims benefit of provisional application No. 62/934,138, filed Nov. 12, 2019, entitled "Fluid Delivery System", naming Robert B. Johnson et al. as inventors, which application is incorporated herein by reference in its entirety.

BACKGROUND

Field of the Invention

The disclosure relates to fluid delivery systems, and more particularly to management of irrigation systems or other fluid delivery systems.

Description of the Related Art

Fluid delivery systems have various commercial and consumer applications in which a client (e.g., a consumer, commercial enterprise, or an agent thereof) seeks to manage delivery of a resource to reduce waste and lower costs. Conventional fluid delivery system devices are not interoperable with cloud-based services and all information desired for monitoring and management of the fluid delivery system may not be available from sensors compatible with fluid delivery system devices. Accordingly, fluid delivery systems and associated techniques for monitoring and managing those fluid delivery systems are desired.

SUMMARY OF EMBODIMENTS OF THE INVENTION

In at least one embodiment, a method for operating a liquid delivery system includes testing the liquid delivery system for leaks and generating a leak indicator based thereon. The method includes, prior to the testing, releasing gas from a mainline of the liquid delivery system. In at least one embodiment, the releasing includes closing a master valve between the mainline and a fluid source, after closing the master valve, opening a zone control valve connected between the mainline and a zone line, and after opening the zone control valve, opening the master valve to fill the mainline with a liquid to reach a fully charged state of the mainline. In at least one embodiment, the testing includes, after the mainline reaches the fully charged state, closing the zone control valve while the master valve remains open, and determining a flow rate of the liquid in the mainline after closing the zone control valve. In at least one embodiment, the testing includes generating the leak indicator based on the flow rate and a predetermined threshold flow rate.

In at least one embodiment, the method includes generating an alert indicating a risk of leaks in the liquid delivery system in response to a determination of whether valves in the liquid delivery system are communicatively coupled to a central system. In at least one embodiment, the method includes selectively suspending a predetermined schedule for liquid delivery based on the leak indicator. In at least one embodiment, the method includes detecting an event in the liquid delivery system, identifying a corresponding type of the event as a leak event type or a non-leak event type, and adjusting execution of a predetermined program for operating the liquid delivery system in response to detecting the event and the corresponding type being the leak event type.

In at least one embodiment, the adjusting includes disabling the liquid delivery system based on detection of the event and the corresponding type being the leak event type. In at least one embodiment, the method includes maintaining the execution of the predetermined program based on detection of the event and the corresponding type being the non-leak event type. In at least one embodiment, the method includes communicating metadata to a central system, receiving sensor data from a sensor in the mainline, and converting the sensor data from a sensor interface format selected from a plurality of sensor interface formats to the metadata.

In at least one embodiment, a liquid delivery system includes a system controller, a mainline selectively coupled to a liquid source using a master valve, a flow meter in the mainline and communicatively coupled to the system controller, and the master valve. The master valve is disposed between the mainline and a utility fluid line at an inlet to the mainline. The master valve is communicatively coupled to the system controller. The system controller is configured to generate control signals for the master valve to test the liquid delivery system for leaks, generate a leak indicator based on a signal received from the flow meter, and release gas from the mainline prior to the test. In at least one embodiment, the system controller includes a storage element configured to store instructions and a processor configured to execute the instructions. The instructions are executable by the processor to cause the processor to generate the control signals. In at least one embodiment, the control signals are configured to close the master valve, open a zone control valve connected between the mainline and a zone line after the master valve closes, and open the master valve to fill the mainline with a liquid to reach a fully charged state of the mainline after the zone control valve opens.

BRIEF DESCRIPTION OF THE DRAWINGS

The disclosure may be better understood, and its numerous objects, features, and advantages made apparent to those skilled in the art by referencing the accompanying drawings.

FIG. 8 illustrates a functional block diagram of an exemplary fluid delivery system including multiple interface controllers coupled in series to communicate between a central system and a local fluid delivery system in an environment not suitable for wide area network wireless communications consistent with at least one embodiment of the invention.

The use of the same reference symbols in different drawings indicates similar or identical items.

DETAILED DESCRIPTION

A typical fluid delivery system in an irrigation application includes a mainline coupled to a water supply by a master valve. The master valve is an electric valve that is installed at the point where water flows from the water supply into the mainline. The mainline includes at least one pipe that is under constant pressure. The mainline is connected to various zone lines that branch off from the mainline and lead to an associated water receiving zone. Each zone line is controlled by a zone control valve that is activated by a system controller to deliver water. In general, an irrigation system can include any number of water receiving zones (e.g., 1, 10, 100, or more water receiving zones). Water flowing through the water receiving zone is typically directed to one or more outlet devices (e.g., nozzles, sprinkler heads, or other outlet devices). In some embodiments, an irrigation system includes multiple mainlines communicatively coupled to the system controller, e.g., in an irrigation system that includes multiple water sources. Typical irrigation systems include a flow rate sensor just downstream of the master valve and a municipal water provider may include a water meter at the point of connection of a utility line to the master valve. The flow rate sensor measures the rate of water flow, e.g., in gallons per minute (gpm), through the mainline, and communicates that data to the system controller. The water meter measures a volume of water delivered by the water supply to a property. The system controller may periodically run tests of the water delivery system that increase the likelihood of detecting a leak in the water delivery system.

Figure 1:
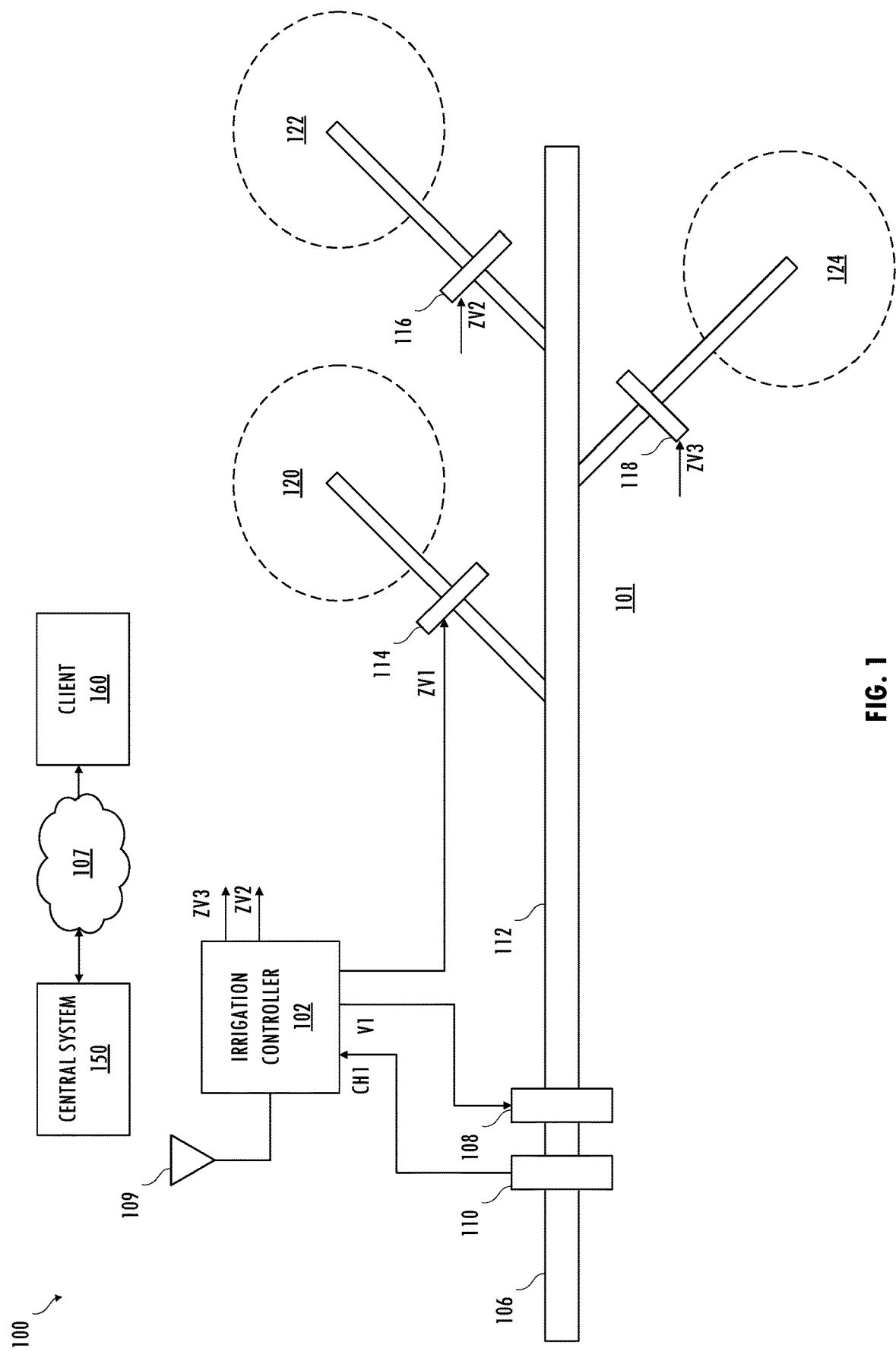
FIG. 1 illustrates a functional block diagram of an exemplary fluid delivery system consistent with at least one embodiment of the invention.

Referring to FIG. 1, fluid delivery system 100 includes central system 150 that communicates with a client interface 160 to provide fluid delivery management resources to a user. Central system 150 is cloud-based and is accessible to client interface 160 via network 107, which includes a network of interconnected computers and communications devices (e.g., the Internet). Irrigation controller 102 communicates with central system 150 via network 107 using wireless interface 109. In other embodiments, irrigation controller 102 is coupled to central system 150 by wireline communications. Irrigation controller 102 provides control signals that enable and disable water delivery from utility line 106 to water receiving zones 120, 122, and 124 via mainline 112. Mainline 112 includes all of the pipes between utility line 106 and irrigation zone control valves 114, 116, and 118. Although mainline 112 may be a single linear pipe, in other embodiments mainline 112 has a loop configuration or comprises additional pipes. Central system 150 communicates commands to irrigation controller 102 to test the fluid delivery system for leaks and feeds back information received from sensor 110 (e.g., utility water meter, flow rate sensor, or pressure sensor) to central system 150. For example, central system 150 electronically controls master valve 108 and zone control valves 114, 116, and 118 to open or close using control signals V1, ZV1, ZV2, and ZV3, respectively. Irrigation controller 102 includes sensor interface channel CH1 that receives flow rate information from sensor 110.

In at least one embodiment, sensor 110 is a flow rate sensor that measures mass or volumetric flow rate of a fluid in mainline 112. A typical flow rate sensor provides data in gallons per minute (gpm) using pulses (e.g., a contact closure pulse input signal), although other rates and signal formats may be used. Irrigation controller 102 includes a sensor channel that can receive the pulsed signal (e.g., a contact closure pulse input interface) and converts it into a digital signal (e.g., using a counter to count a total number of pulses received over a predetermined time) for communication to central system 150. Central system 150 converts that digital signal into a corresponding flow rate, e.g., using a predetermined look-up table or a digital-to-flow rate value conversion algorithm, for use in data analytics and cost generation performed by central system 150.

Figure 2:
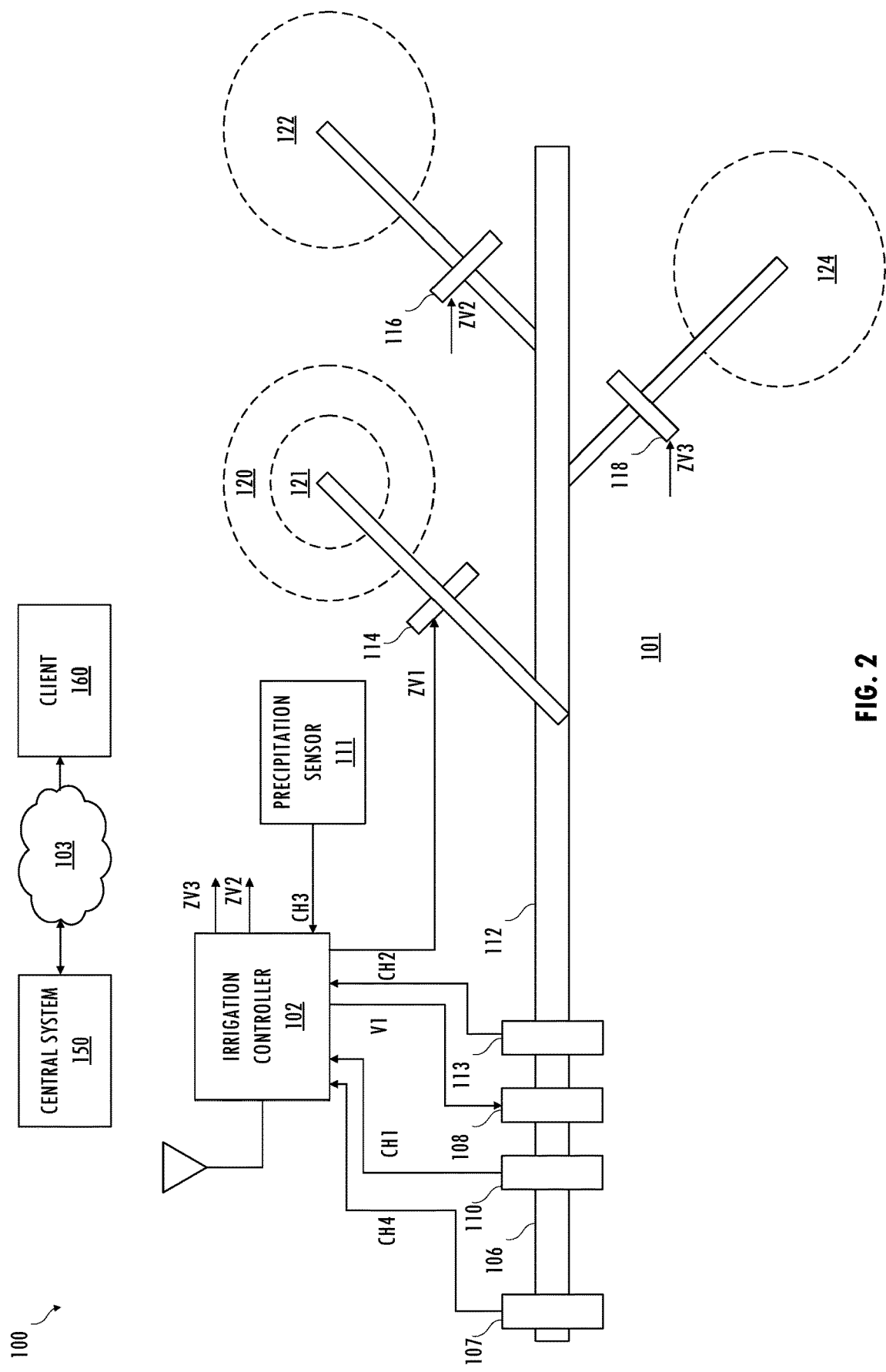
FIG. 2 illustrates a functional block diagram of an exemplary fluid delivery system including multiple sensors consistent with at least one embodiment of the invention.

Referring to FIG. 2, in at least one embodiment, fluid delivery system 100, includes additional sensors. For example, precipitation sensor 111 is located proximate to mainline 112 and provides information regarding type, amount, or speed of precipitation falling at property 101. Pressure sensor 113 is included in mainline 112 and is communicatively coupled to irrigation controller 102 via channel CH2. Unlike a flow rate sensor, a pressure sensor provides information that allows a water management system to adjust throughput and maintain water pressure under some circumstances. In at least one embodiment of fluid delivery system 100, pressure sensor 113 provides pressure information to central system 150 via irrigation controller 102. Software executing on irrigation controller 102 or central system 150 monitors the water throughput and the water pressure, and selectively enables water delivery in water delivery zones to maintain a predetermined throughput without dropping below a pressure threshold to schedule water delivery in compliance with local water restrictions.

For example, during summer months, local water restrictions require that irrigation occur only during predetermined timeslots. Accordingly, fluid delivery system 100 enables irrigation of water receiving zones 120, 122, and 124 simultaneously to maximize the amount of water delivered to those zones during authorized water delivery time slots. However, fluid delivery system 100 adequately irrigates each water receiving zone only if fluid delivery system 100 maintains a minimum amount of pressure in mainline 112. If the water pressure in mainline 112 falls below that predetermined pressure threshold, fluid delivery system 100 does not achieve the target coverage and water delivery is less effective (e.g., smaller-sized water receiving zone 121 receives the target amount of water delivery instead of entire water receiving zone 120). Thus, central system 150 uses water pressure information to manage the number of water receiving zones receiving water in parallel to maintain a suitable amount of water pressure to provide target zone coverage. In other months when water restrictions are reduced or eliminated, central system 150 enables irrigation of the water receiving zones serially instead of in parallel, therefore delivering adequate amounts of water to each target water receiving zone. In addition, information provided by pressure sensor 113 may be stored and used to alert a client when flow meter filters should be cleaned or replaced in response to a reduction of water pressure over time caused by debris being captured in the filters.

A typical pressure sensor is installed in mainline 112 (or in a zone line) and has a 4-20 mA interface. Irrigation controller 102 includes a sensor channel that can receive the 4-20 mA signal and convert it into a digital format (e.g., using an analog current-to-digital converter) for communication to central system 150. Central system 150 converts that raw digital value into a corresponding pressure value, e.g., using a predetermined look-up table or a digital-to-pressure value conversion algorithm for use in data analytics and cost generation performed by central system 150.

In at least one embodiment, fluid delivery system 100 includes utility flow meter 107. Irrigation controller 102 includes an interface channel that is compatible with the utility flow meter. Utility flow meter 107 provides the information to central system 150 via irrigation controller 102. Central system 150 can use this information instead of, or in addition to, information received from other sensors.

Figure 3:
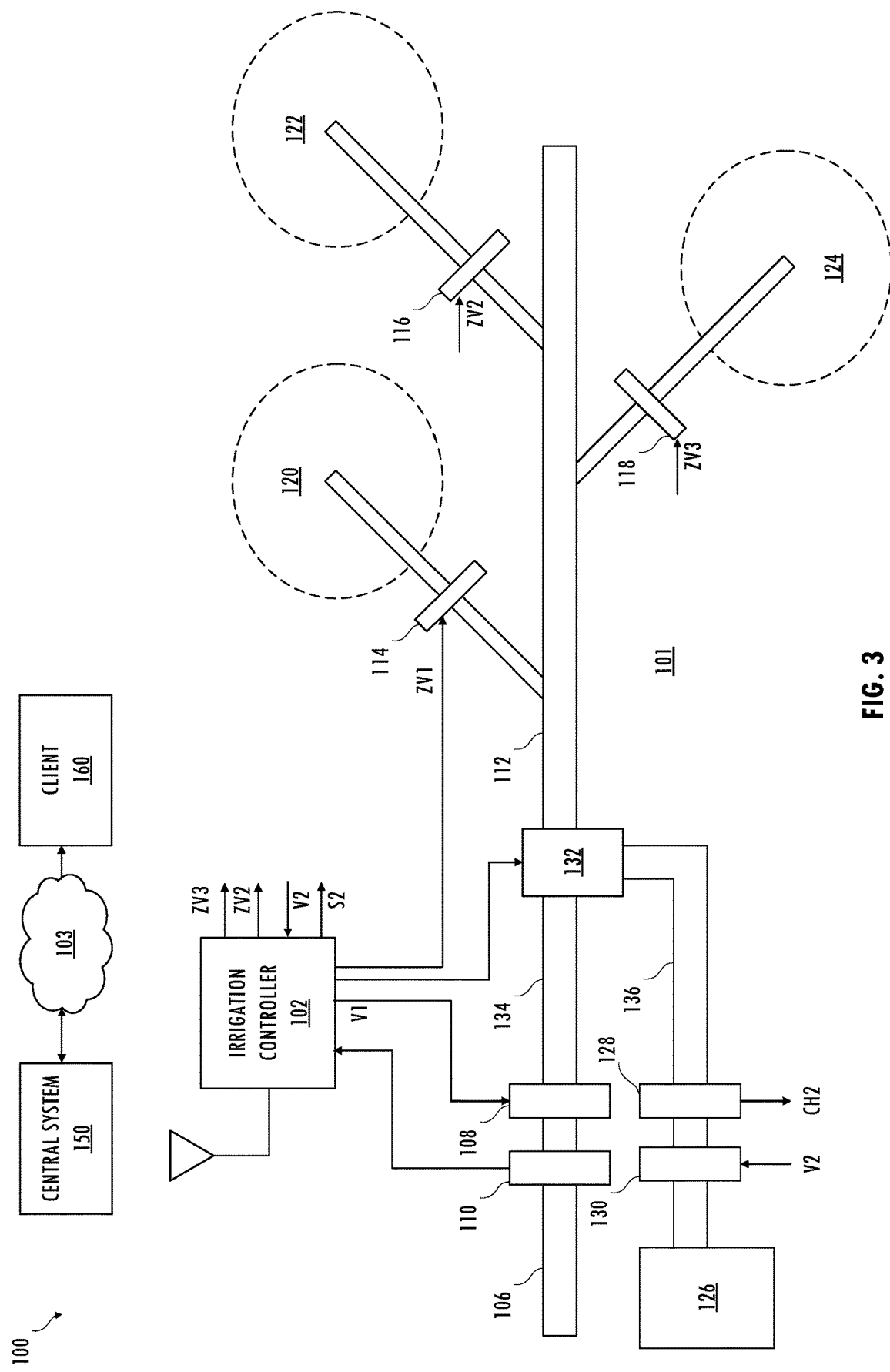
FIG. 3 illustrates a functional block diagram of an exemplary fluid delivery system including multiple fluid sources consistent with at least one embodiment of the invention.

FIG. 3 illustrates an embodiment of fluid delivery system 100 that includes multiple sources of water. Mainline 112 receives water from the municipal water supply using utility line 106 and mainline portion 134. Mainline 112 also receives water from an additional source 126 (e.g., another municipal water supply, a drilled well, a drainage pond, or rainwater holding tank) using mainline portion 136. Joint 132 couples the plurality of water supplies to mainline 112. Joint 132 may include a valve that is controlled by irrigation controller 102. Sensor 128 is included in mainline portion 136 and provides information to irrigation controller 102 using channel CH2. Irrigation controller 102 selectively opens or closes valve 130 according to a scheduled irrigation program using control signal V2. Sensors included in fluid delivery system 100 provide information that allows central system 150 to intelligently control usage of a plurality of water supplies to reduce cost to a client. Central system 150 monitors usage and water rates for each water supply and selectively enables delivery of water from each of the water supplies to reduce or minimize costs. Multiple water supplies may deliver water simultaneously to optimize water delivery from suppliers using tiered cost structures.

Although FIGS. 1-3 illustrate sensors at a connection point of the water supply to the mainline, in other embodiments, fluid delivery system 100 includes additional sensors in other portions of mainline 112 or in zone lines, which may improve water management in some applications (e.g., leak detection). After detecting a leak, the central system may be unable to identify a location of the leak if only a few sensors are used, thus requiring manual inspection to identify the leak location. In other embodiments that include increased number of sensors distributed across various locations of central system 150, the central system can narrow down the leak location or even pinpoint the leak location.

Figure 4:
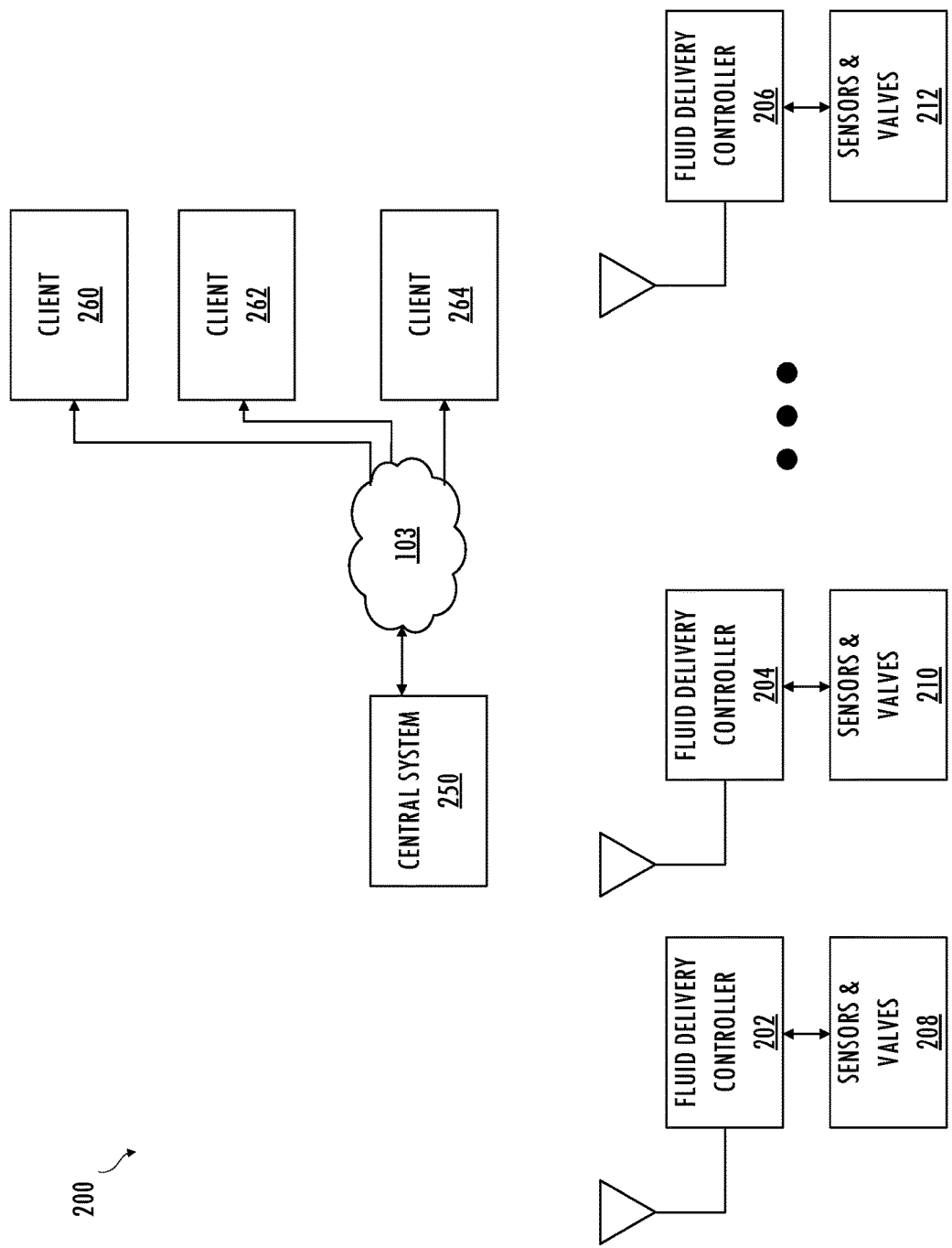
FIG. 4 illustrates a functional block diagram of a central fluid delivery management system communicatively coupled to a plurality of local fluid delivery systems and a plurality of clients consistent with at least one embodiment of the invention.

FIG. 4 illustrates fluid delivery system 200 that provides multiple clients (e.g., clients 260, 262, and 264) with a remote interface to manage corresponding fluid delivery systems using fluid delivery controllers (e.g., fluid delivery controller 202, 204, and 206) located at one or more properties associated with each of those clients. Each property includes a corresponding fluid delivery controller that provides a wireless interface for communication of sensor information and valve control signals between the corresponding fluid delivery controller and central system 250. Sensors and valves 208, 210, and 212 vary with fluid delivery applications at each property. In addition to irrigation systems, techniques described herein are applicable to other applications, e.g., cooling towers, distilleries, dairies, natural gas delivery, petroleum pipelines, or other commercial or residential applications that use fluid delivery techniques. Accordingly, sensors and valves 208, 210, and 212 include electric meters, pH sensors, conductivity sensors, flow meters, pressure sensors, temperature sensors, humidity sensors, soil moisture sensors, rain sensors, voltage sensors, plant health sensors, water level sensors, sunlight sensors, oxidation-reduction potential sensors, or combinations thereof suitable for the corresponding application. In at least one embodiment of fluid delivery system 200, electric meters provide information that allows central system 250 to manage usage of electricity by fluid delivery system 200. Applications using electric pumps may use electricity information and schedule fluid delivery to reduce or minimize electricity costs. For example, software executing on central system 250 monitors the electric rates and fluid usage and selectively enables fluid delivery during an authorized time that corresponds to the lowest electricity rates.

Central system 250 provides each of clients 260, 262, and 264 with access to information received from corresponding properties. Central system 250 provides reports in tabular form, graphically, on a property map, or combinations thereof (e.g., tables of expected and actual water consumption located at corresponding locations of a property map). The reports may illustrate actual and expected values of costs, comparisons of current usage and historical usage, comparisons of current costs and historical costs, flow rates, fill rates, fill-time duration, water movement, consumption, and identify locations of leaks and provide recommendations for cost savings and estimate actual cost savings due to advanced leak detection capabilities of central system 250. Central system 250 may monitor and provide management tools for various clients across multiple enterprises and can provide aggregated reports for each client across their corresponding enterprises or properties. Clients can selectively enable central system 250 to provide alerts that indicate any detected leaks, recommended or routine maintenance (e.g. filter replacement), rate increases, unauthorized uses of water, usage or cost information, configuration risk, plant health, low battery, water quality, oxidation-reduction potential, faulted two wire, landscaper onsite, faulty rain sensor, multiple water source management, portfolio/region benchmarking, extreme weather, extended drought, or other alerts. Clients can instruct central system 250 to update schedules and alerts remotely (e.g., using a web page interface or other user interface).

Figure 5:
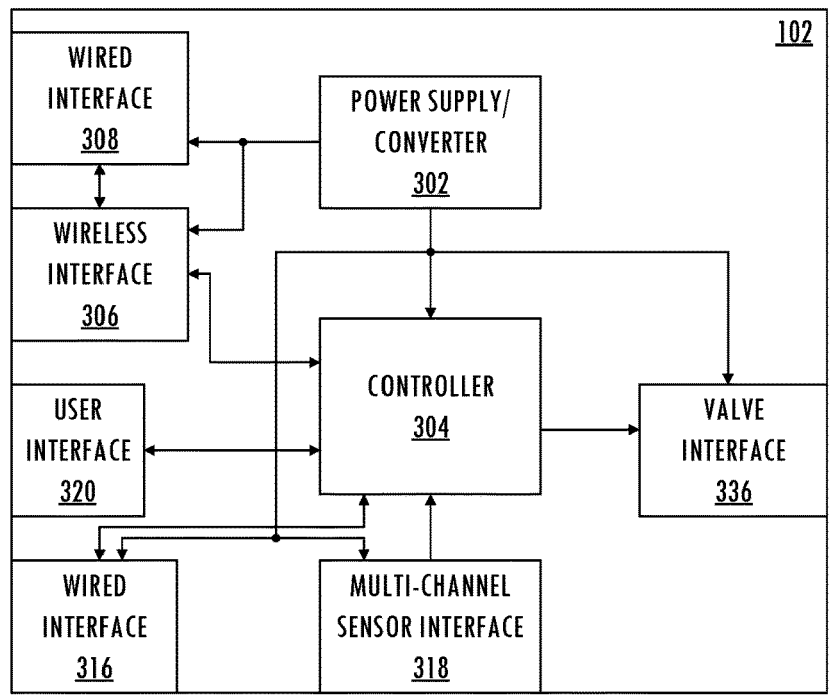
FIG. 5 illustrates a functional block diagram of an exemplary fluid delivery controller integrating interface control and irrigation control consistent with at least one embodiment of the invention.
Figure 6:
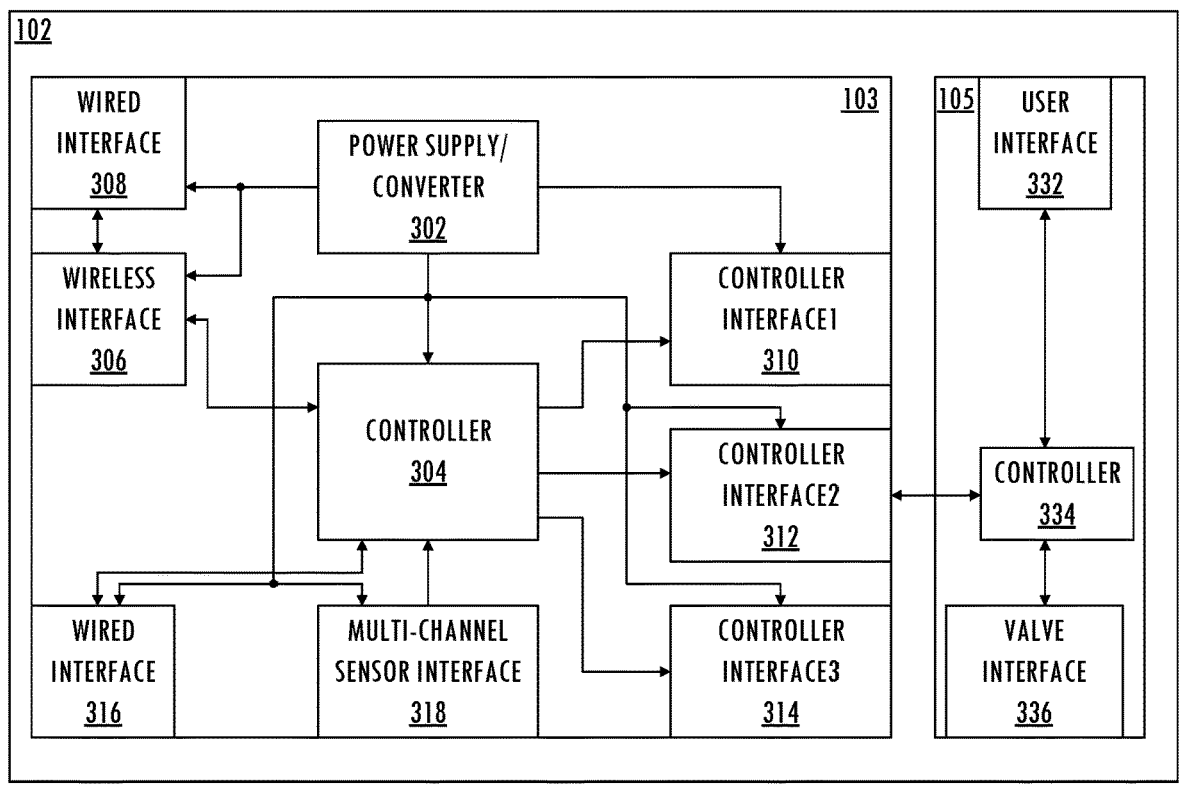
FIG. 6 illustrates a functional block diagram of an exemplary fluid delivery controller implemented using an interface controller device and an irrigation controller device consistent with at least one embodiment of the invention.
Figure 7:
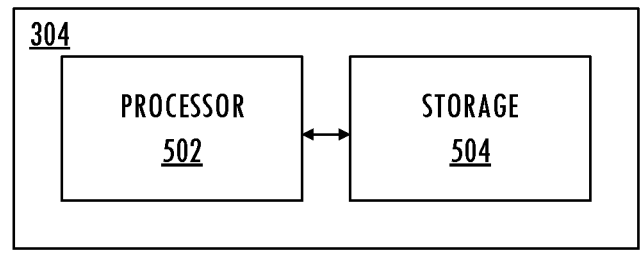
FIG. 7 illustrates a functional block diagram of an exemplary controller of the fluid delivery controllers of FIGS. 5 and 6.

Referring to FIGS. 5, 6, and 7, in at least one embodiment, irrigation controller 102 includes controller 304 that is configured to generate control signals that selectively open and close valves of a water delivery system using signals provided by valve interface 336. Controller 304 receives sensor information from one or more sensors using multi-channel sensor interface 318. Multi-channel sensor interface 318 may be communicatively coupled to one or more sensors, e.g., a pressure sensor, flow rate sensor, utility water meter, precipitation sensor, other sensor, or combinations thereof. In at least one embodiment, multi-channel sensor interface 318 includes a 4-20 mA signal interface and a contact closure pulse input interface, although other signaling protocols may be implemented by one or more channels of multi-channel sensor interface 318.

In at least one embodiment, controller 304 includes processor 502 that executes firmware (i.e., instructions) retrieved from storage 504. Controller 304 executes a main process that detects an established communication channel with a central system. If the main thread does not detect a communication channel with the central system, the main thread establishes a communication channel with the central system. Processor 502 executes an additional thread for each sensor channel. Each of these additional threads polls a corresponding channel for incoming messages from a corresponding sensor. The main thread periodically polls each sensor thread in round-robin order. For those sensors that implement a request-response interface, in response to an empty payload, the main thread does nothing. In response to receiving a payload message from a sensor, the main thread receives the message, converts the payload to metadata for communication to a central system and sends the metadata to the central system. In addition, the main thread may process the sensor inputs to determine whether a sensor needs recalibration.

In some embodiments, irrigation controller 102 sends metadata to the central system as the sensor messages are received, thereby allowing the central system to provide real-time data to a client. In at least one embodiment, irrigation controller 102 implements a power-savings configuration that queues sensor messages or associated metadata and sends metadata for multiple sensor messages to the central system (e.g., sends data received from multiple sensors to the central system at one time). If the period is sufficiently short, the central system can approximate real-time data delivery, the client will not experience a noticeable delay, and irrigation controller 102 will consume less power than in a real-time mode of operation. In at least one embodiment, the metadata includes sensor data, a channel identifier (e.g., a sensor identifier), and time of the sensor data, or other identifying information.

Referring to FIGS. 5 and 6, irrigation controller 102 includes wired interface 308 that provides an interface for digital parallel communications (e.g., a Universal Serial Bus (USB) interface). Wired interface 308 may be used to communicate with another device to locally update software, parameters, or scheduling information stored in controller 304. Wired interface 316 implements a digital serial communications interface (e.g., a RS-485 UART interface) that may be used to digitally communicate with sensors that have a compatible interface (e.g., ultrasonic flow sensing or electricity meters) or to communicate with another irrigation controller 102, as described further below.

Wireless interface 306 communicatively couples irrigation controller 102 to a central system via a wireless network (e.g., wireless wide area network, local area network, or wireless personal area network protocols) and a network of interconnected computers and communications devices. In at least one embodiment, irrigation controller 102 receives firmware updates from a central system via wireless interface 306. User interface 320 locally displays information from controller 304 and provides manual inputs received directly from a user to controller 304. User interface 320 may include a touchscreen display, liquid crystal display, keypad, dial, other input device, or a combination thereof. Power supply and converter 302 provides suitable power supply signals to each of the various components of irrigation controller 102 and may be coupled to a 12-24 VAC supply or an energy harvesting device. In other embodiments of irrigation controller 102, only a subset of the components illustrated are included depending on the application (e.g., controller interfaces 310, 312, or 314 of interface controller 103 are excluded).

Referring to FIG. 6, in at least one embodiment, irrigation controller 102 includes separate devices for local irrigation controller 105 and interface controller 103. In at least one embodiment, local irrigation controller 105 includes user interface 332 and valve interface 336 controlled by controller 334, as described above, but is incompatible with wireless communication with a central system or one or more sensor interfaces described above. Accordingly, interface controller 103 implements features for communicating between local irrigation controller 105 and a central system, and between various types of sensors and the central system. In at least one embodiment, interface controller 103 includes a plurality of controller interfaces (e.g., controller interfaces 310, 312, and 314) that are compatible with different interfaces of local irrigation controllers of different vendors. Controller 304 selectively enables one of controller interfaces 310, 312, and 314, based on an identification sequence, a manual input, or predetermined selection stored in memory that corresponds to the interface of local irrigation controller 105. The plurality of controller interfaces allow a preexisting fluid delivery system to be retrofitted to communicate with a central system and one or more sensors of a fluid delivery system.

Referring to FIG. 8, in at least one embodiment, fluid delivery system 700 locates interface controller 103 and fluid delivery controller 218 (e.g., local irrigation controller 105 or irrigation controller 102 described above, or other fluid delivery controller) in an environment that is not suitable for wide area wireless communications (e.g., below ground, within a mountain, etc.). Accordingly, interface controller 103 can communicate with fluid delivery controller 218 via wireline communications and interface controller 103 communicates information between fluid delivery controller 218 and an additional interface controller or a network of additional interface controllers (e.g., interface controllers 214 and 220), which communicate wirelessly to a central system. In at least one embodiment of fluid delivery system 700, at least one sensor communicates information to the additional interface controller. For example, sensor 222 is not accessible interface controller 103 or fluid delivery controller 218. Thus, sensor 222 communicates precipitation information to interface controller 220.

Figure 9:
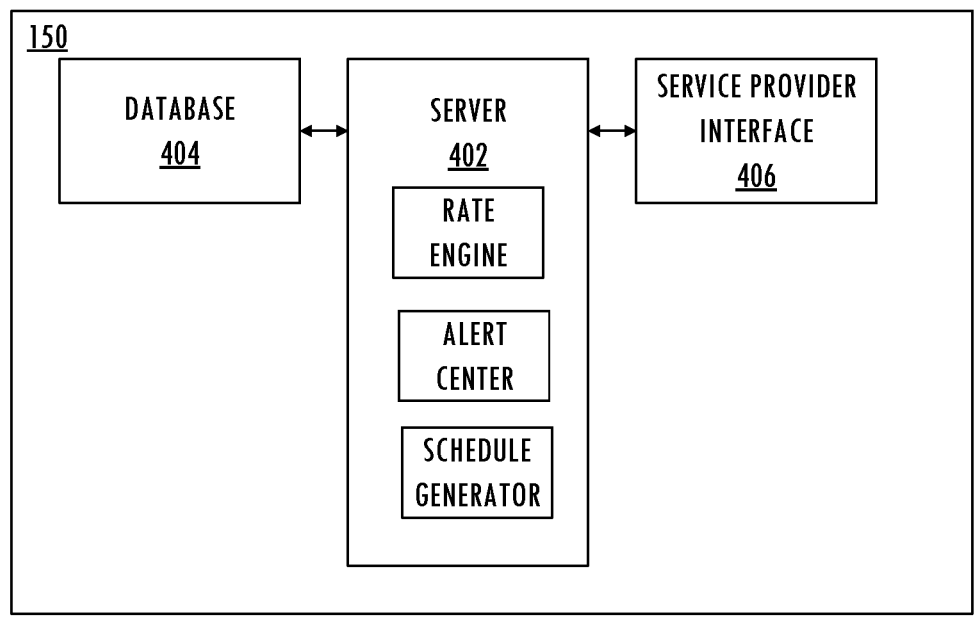
FIG. 9 illustrates a functional block diagram of an exemplary central system consistent with at least one embodiment of the invention.

FIG. 9 illustrates an exemplary embodiment of central system 150. Server 402 includes interfaces for receiving information from fluid delivery controllers located at remote properties and stores that information in database 404. In at least one embodiment, central system 150 provides service provider interface 406 including a display and input devices for the service provider to manage multiple properties and client interfaces. Database 404 stores flow data, cost data, user data, leak data, alarm data, property configuration data, schedules, rate information, or other information. Server 402 includes at least one processor or other device configured to execute a computer program to analyze data stored in database 404, implement alert services, email services, and scheduling services, and provide reports, dashboards, alert oversight, and notifications (e.g., email, texts, etc.) to clients. A client may be a subscriber to the fluid management service provided by central system 150.

In at least one embodiment, server 402 implements a rate engine that converts fluid supplier or utility rate information into a cost function and converts flow data or utility usage into cost data. The rate engine periodically updates the cost functions or maintains historical cost functions or historical data associated with each fluid supplier for each client. The rate engine cross-references cost data with monitoring information to associate costs to each of multiple flow types. The rate engine generates cost reports and associates flow trends with cost to provide a client with fiscal insight to the flow data. For example, server 402 collects rates from each water supplier associated with a client and generates a utility rate structure for each water supplier including rates for various seasons and tiers of water usage. For each water supplier associated with a client, the rate engine provides information for a number of gallons used or cost for one or more time periods. In addition, the rate engine calculates prevented use savings based on leak detection or other alerts provided to the client during a time period. Prevented use savings due to leak detection may be determined based on a size of the leak detected. For example, a 90 gpm leak would be caught faster than a 10 gpm leak since it would be easier to detect by visual inspection (e.g., due to ponding on site).

Server 402 includes an alert center that uses metadata received from sensors and stored in database 404 to check for preconfigured conditions that trigger alarms. If the metadata triggers an alarm, server 402 sends an alert to the corresponding client (e.g., via text or email). In at least one embodiment, central system 250 is selectively configurable to send alerts to clients when water usage over a predetermined period of time exceeds one or more predetermined thresholds of a predetermined water budget (e.g., 70, 80, or 90% of the predetermined water budget). Clients can access reports generated by server 402 using client-side web pages that provide visuals for real-time data, current report status, active and past alarms, and scheduling.

In at least one embodiment, server 402 communicates with a fluid delivery controller using conversations communicated via the Internet protocol. Server 402 or the fluid delivery controller initiate the conversation with a query or comment, followed by a response from the recipient, and in some circumstances, a confirmation. Conversations begin at the server or the controller end. The initial transmission is a query or a command, followed by a response from the other end and perhaps a confirmation from the originator. Each conversation has an identifying number to match responses and confirmations to queries/commands. The messages include a conversation identifier, a message header in the first message of a conversation, and zero or one or more data elements, and a message terminator. The message header identifies the message, the accompanying data elements, and a type of response expected. Messages include authentication message, controller request for schedule message, controller flow configuration report request, controller flow report request, request for controller to send an error log, request for controller to send signal strength and bit error rate, request for controller to send currents of each active valve, request for controller to send weather data or soil status data, flow information request, de-schedule valve request, valve turn-off request, valve turn-on request, delete controller schedules, time request, download schedules. However, other messages may be used to implement communications consistent with the operation of a fluid delivery system, as described herein.

Figure 10:
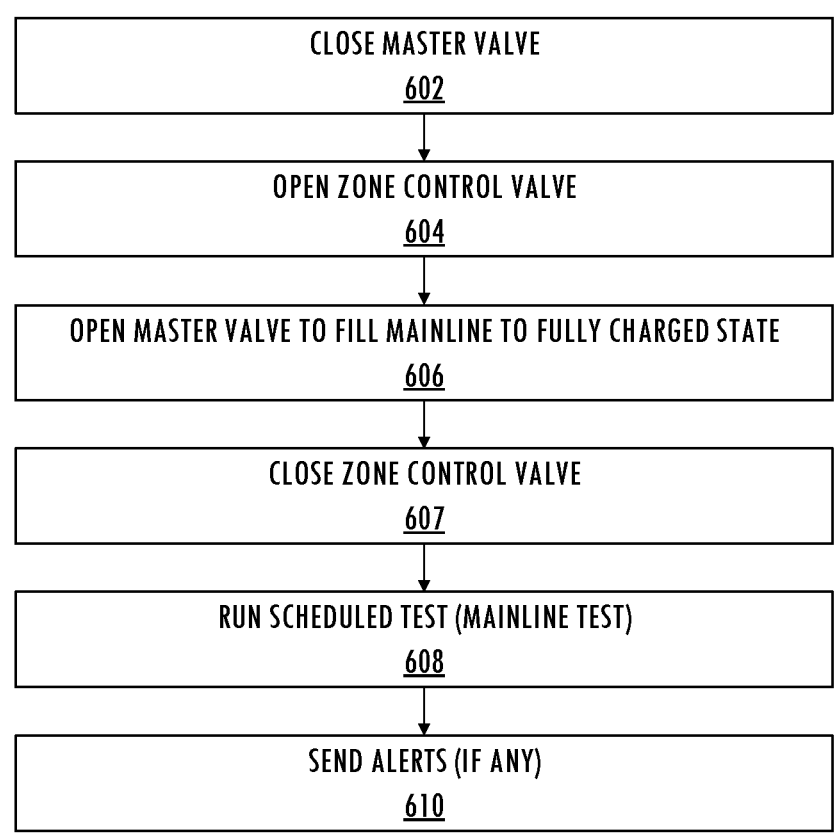
FIG. 10 is a flowchart illustrating information and control flows for blowout prevention for use in testing a liquid delivery system consistent with at least one embodiment of the invention.

Referring to FIGS. 1 and 10, in at least one embodiment, central system 150 periodically initiates a technique that reduces or eliminates the impact of the air or gas captured with water or other fluid in the irrigation system, e.g., pressure damage, pipe cavitation, or blowout (i.e., an uncontrolled release of fluid). In some embodiments, central system 150 performs the blowout prevention technique at the beginning of any scheduled test (e.g., a mainline test). In general, fill time is the amount of time to reach a fully charged state, i.e., the time for the mainline to reach maximum pressure. In a fully charged state, if the mainline has no leaks, fluid flow is constant. Each mainline has an expected fill time determined during an initial configuration test of the fluid delivery system. Differences in an actual fill time and the expected fill time and a consumption profile for the fluid delivery system can indicate a leak and the expected fill time is useful for quantifying the loss of water due to system leaks after the mainline is fully charged. A constant flow rate can be used to detect the fully charged state in the absence of a pressure sensor. If the master valve is closed, a leak is present if the mainline is fully charged and there is constant flow.

Central system 150 closes master valve 108 (602). After closing master valve 108, central system 150 opens a zone control valve to provide a gas release point (604). In at least one embodiment, the zone control valve that is opened is the farthest zone control valve (e.g., zone control valve 116) from master valve 108 to efficiently clear gas from all zones, but other zone control valves may be used. Central system 150 then opens master valve 108 to fill mainline 112 to a fully charged state (606). After mainline 112 reaches the fully charged state, central system 150 closes the zone control valve that was opened (607) and then runs a scheduled test (e.g., mainline test) (608). After the scheduled test completes, central system 150 sends any relevant alerts to the corresponding client (610). Although the blowout prevention technique is described with reference to water delivery, the technique is applicable to delivery systems for other liquids.

Figure 11:
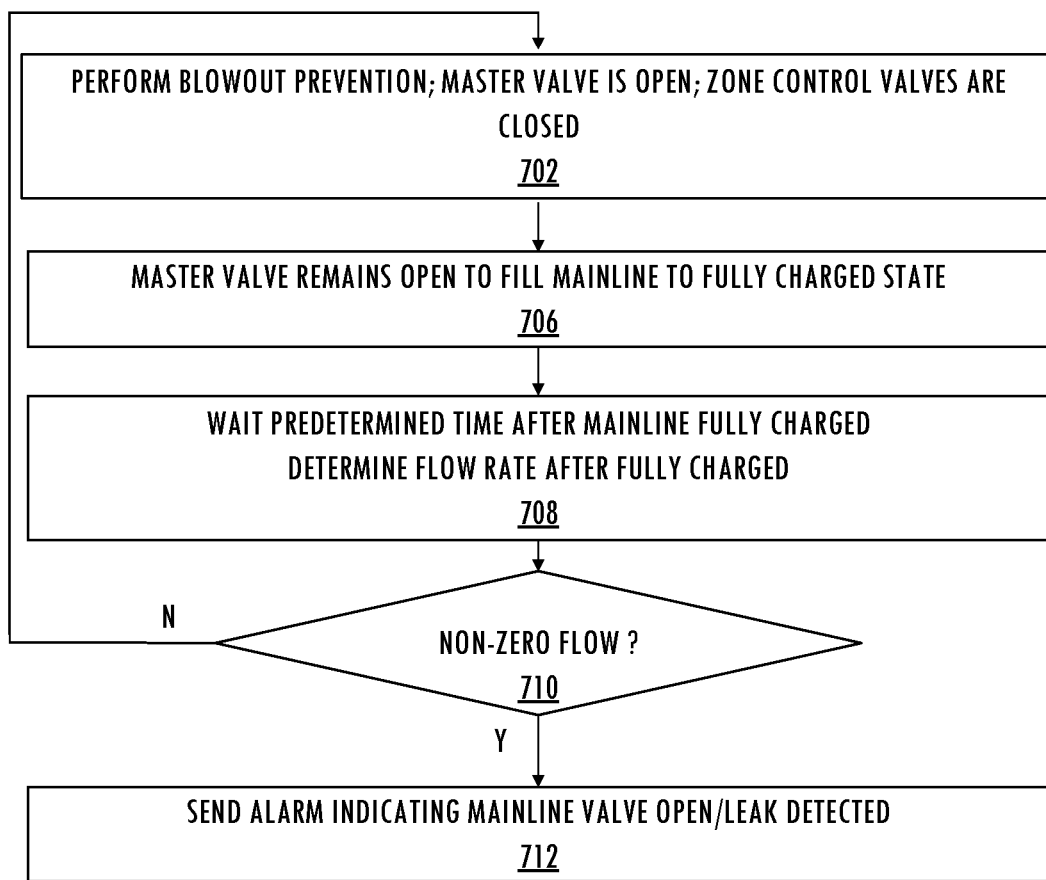
FIG. 11 is a flowchart illustrating information and control flows for mainline testing of a fluid delivery system consistent with at least one embodiment of the invention.

Referring to FIGS. 1 and 11, in at least one embodiment, after central system 150 performs the blowout prevention technique (702), master valve 108 is open and zone control valves are closed. Next, central system 150 begins a mainline test. Master valve 108 remains open and fills the mainline to a fully charged state (706). Central system 150 waits a predetermined time after the mainline is fully charged and determines the flow rate after the mainline is fully charged (708). If the flow rate is zero or below a predetermined threshold value (710), then no leak or open master valve is detected and central system 150 runs blowout prevention again at a next testing interval (702). If the flow rate is non-zero or above a predetermined threshold value (710), then central system 150 sends an alert to the client (712) and in some embodiments, automatically shuts off the mainline or suspends scheduled water delivery. In some circumstances, blowout prevention (702) is omitted (e.g., for testing fluid delivery systems where the fluid is a gas).

Figure 12:
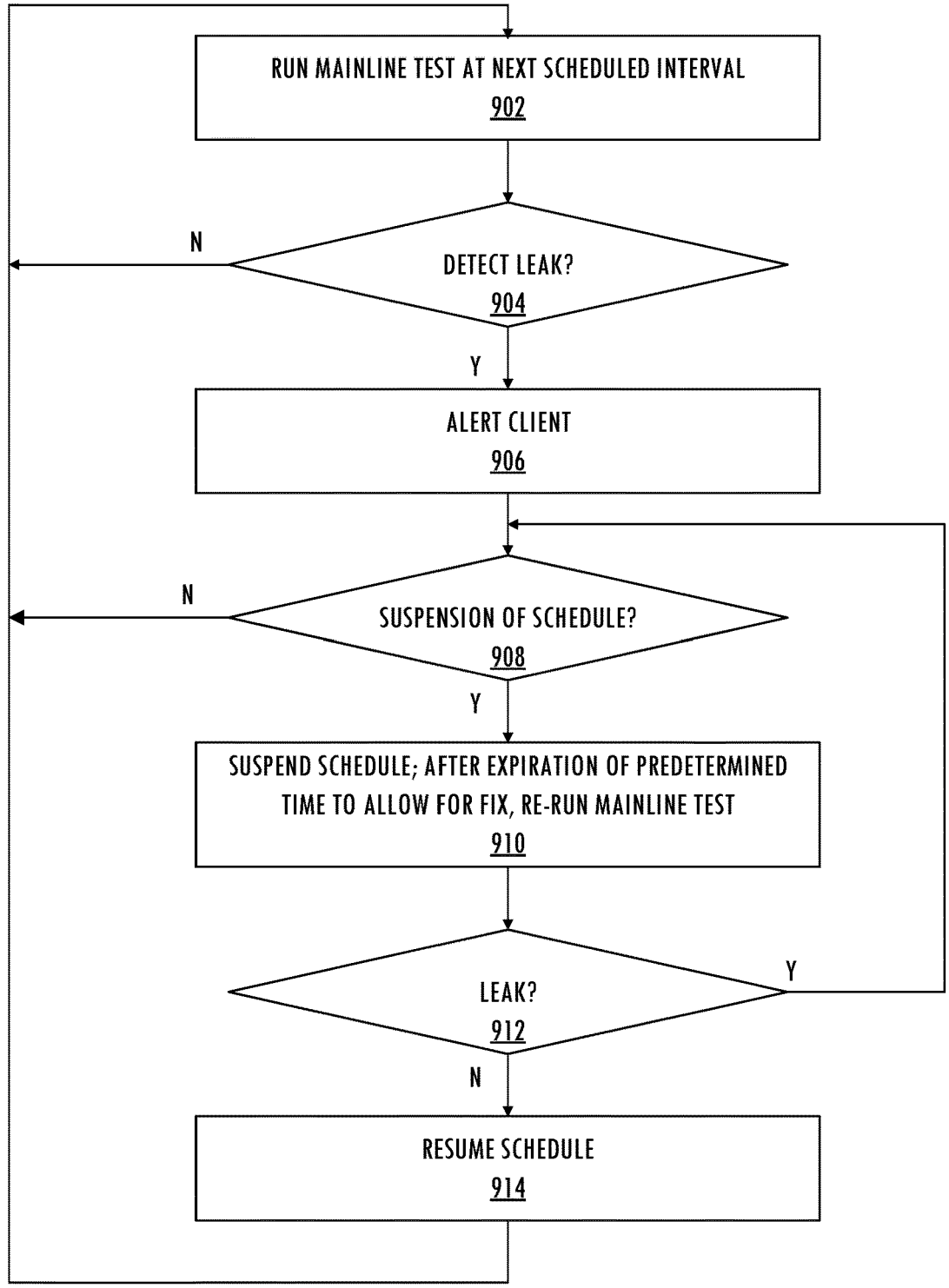
FIG. 12 is a flowchart illustrating information and control flows for automatic suspension of a fluid delivery system operation consistent with at least one embodiment of the invention.

FIGS. 1 and 12 illustrate an embodiment of a fluid delivery system that implements automatic shutoff or automatic schedule suspension in response to detecting a leak. Central system 150 analyzes sensor data received over time and uses predetermined scheduling information to detect events in the fluid delivery system (e.g., unscheduled usage, amount of unscheduled usage, and frequency of unscheduled usage). The central system identifies an event as a leak event type or a non-leak event type, and if enabled, selectively adjusts execution of a predetermined program for operating the fluid delivery system. In at least one embodiment, adjusting execution of the predetermined program includes disabling a zone or suspending execution of the predetermined program based on severity of the leak or seasonal information. In some circumstances, the central system continues the predetermined program. Rather than automatically adjust execution of the predetermined program, a client can manually adjust execution in response to an alert, allowing the client to continue to operate with a leak, e.g., may continue with a leak in summer where a risk of plant loss is higher and in winter the client enables suspension of operation until the leak is fixed.

In at least one embodiment, central system 150 runs a mainline test at a next scheduled interval (902). If the mainline test detects no leak (904), then central system 150 waits until a next scheduled interval to run the mainline test again (902). If the mainline test detects leak (904), then central system 150 alerts the client (906). If the fluid delivery system is not configured to suspend a fluid delivery schedule (908), then central system 150 waits until the next scheduled interval to run the mainline test again (902). If the system is configured to suspend a fluid delivery schedule (906), then central system 150 suspends fluid delivery and waits until expiration of a predetermined time to allow for a fix. After that time, central system 150 re-runs the mainline test (910). If central system 150 still detects a leak (912), central system 150 determines if schedule suspension configuration is still enabled (908). If central system 150 no longer detects a leak (i.e., the leak is fixed) (912), central system 150 resumes the water delivery schedule (914).

Figure 13:
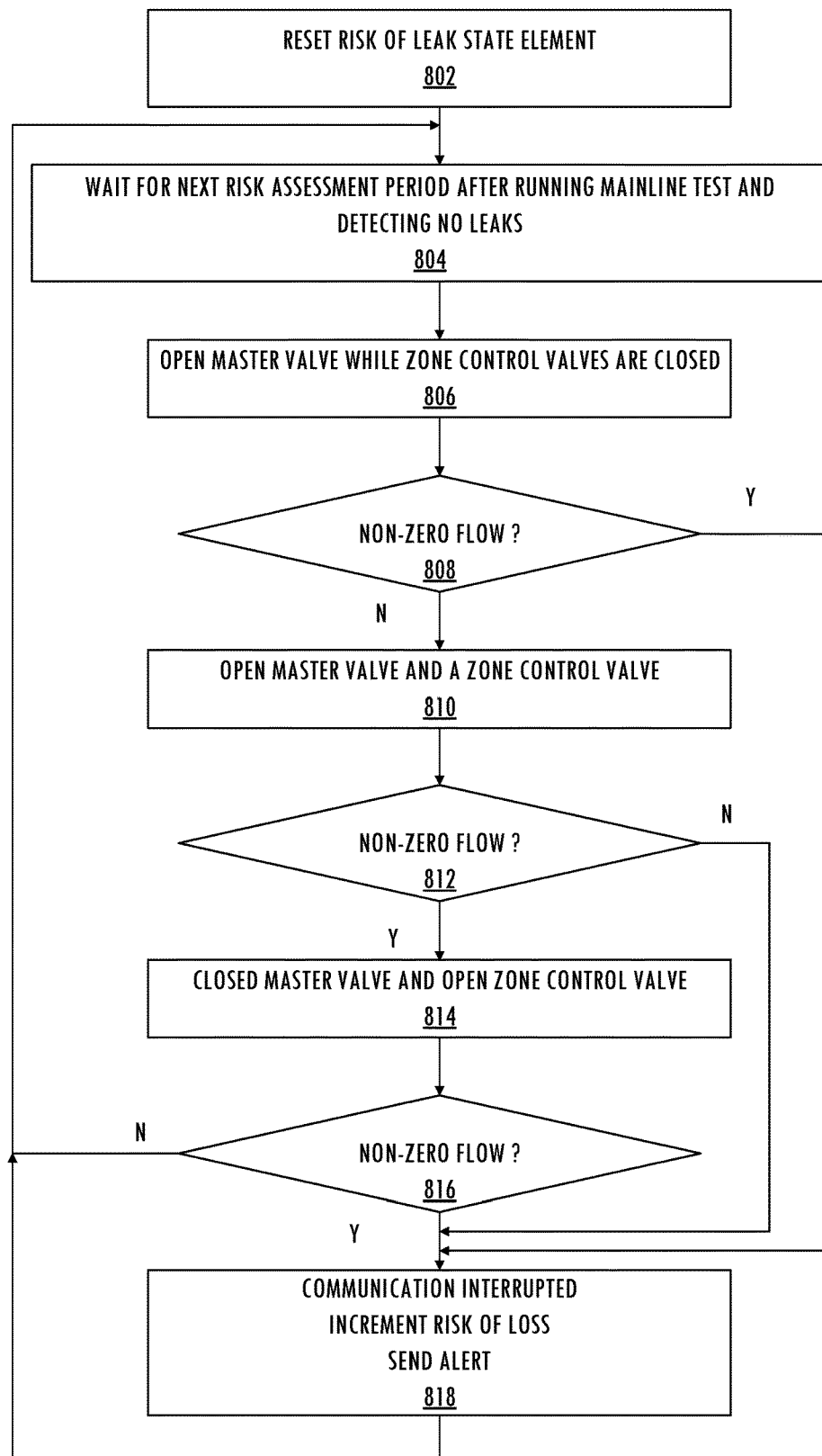
FIG. 13 is a flowchart illustrating information and control flows for assessing risk of leak of a fluid delivery system consistent with at least one embodiment of the invention.

Referring to FIGS. 1 and 13, in at least one embodiment, central system 150 evaluates a risk of loss of fluid. A risk state element may be used to track the risk of loss over time, although some embodiments may provide only contemporaneous information in response to detecting loss of communication with one or more valve in fluid delivery system 100. The risk-of-loss indicates that at least one valve is unresponsive to central system 150. The risk of loss, when tracked over time, increases over the time that at least one valve continues to be unresponsive to central system 150. A valve may become unresponsive to central system 150 if the valve is damaged or replaced. Central system 150 resets risk state element (if used) (802). After running a mainline test and detecting no leaks, central system 150 waits until a next risk assessment period expires (804). Central system 150 opens master valve 108, while zone control valves 114, 116, and 118 remain closed (806). If flow rate sensor 110 indicates a non-zero flow or flow greater than a predetermined threshold value (808), then a zone control valve is open and is not responsive to central system 150. Accordingly, central system 150 increments the risk of loss and sends an alert (818). If flow rate sensor indicates zero flow or flow less than a predetermined threshold value (808), then central system 150 may test additional risk-of-loss conditions.

Central system 150 opens master valve 108 and one of the zone control valves (810). If flow rate sensor 110 indicates zero flow or flow less than a predetermined threshold value (812), then the zone control valve did not open and is not responsive to central system 150. Then, central system 150 increments the risk of loss and sends an alert (818). If flow rate sensor 110 indicates non-zero flow or flow greater than a predetermined threshold value (812), steps 810 and 812 may be repeated for each zone control valve in the system. If flow rate sensor 110 indicates non-zero flow or flow greater than a predetermined threshold value for all zone control valves (812), then central system 150 may test additional risk-of-loss conditions. Central system 150 closes master valve 108 and opens one of the zone control valves (814). If flow rate sensor 110 indicates zero flow or flow less than a predetermined threshold value (816), then the mainline is responsive to central system 150 and central system 150 is fully communicative with fluid delivery system 100. Then, central system 150 waits for the next risk assessment period to expire after running a mainline test and detecting no leaks (804). If flow rate sensor 110 indicates non-zero flow or flow greater than a predetermined threshold value (816), then the mainline is unresponsive to central system 150 and is always open. Accordingly, central system 150 increments the risk of loss and sends an alert (818). Central system 150 then waits for the next risk assessment period to expire after running a mainline test and detecting no leaks (804). Note that in some embodiments, only a subset of the conditions are tested (e.g., 806 and 814) or the conditions are tested in a different sequence.

Referring to FIG. 9, in at least one embodiment of central system 150, database 404 stores environmental data received from one or more sources indicating environmental differences at different properties associated with each client. For example, rain buckets or moisture sensors at one or more properties communicate local environmental data to central system 150 via a fluid delivery controller. An exemplary central system 150 polls one or more websites or other data sources for weather data corresponding to properties associated with each client and stores corresponding weather information in database 404. Server 402 uses the stored environmental and weather data to determine daily water balances for delivery. Server 402 updates the stored environmental and weather data and water balances periodically (e.g., daily, bi-weekly, weekly, etc.). Other relevant information (e.g., seasonal information, soil type, or vegetation type) may be stored in database 404 for use in calculating water balances for each property or each zone of a property. For example, in summer months, during extended periods of dry weather conditions, or regions of dense vegetation, higher water balances may be used. Exemplary water balances specify how many irrigation inches of water to apply to each zone of a property. Server 402 uses these data to generate schedules and automate fluid delivery based on environmental conditions of each property.

In at least one embodiment, central system 150 generates fluid delivery schedules including zone runtimes further based on predetermined fluid delivery windows and any predetermined maximum fluid delivery thresholds. Server 402 calculates zone fluid balances based on information stored in database 404. After calculating fluid balances for one or more properties, central system 150 identifies those zones with fluid balance deficits (e.g., zones that receive insufficient water delivery from precipitation alone and based on the soil type, vegetation, geographic information, seasonal information, or other information). Server 402 determines fluid delivery system runtimes for zones of a property based on corresponding fluid balance deficits and target fluid delivery inches for those zones. In at least one embodiment, central system 150 partitions zone runtimes into smaller fluid delivery cycles to reduce runoff and determines a maximum allowable runtime and a minimum allowable runtime for each zone, e.g., based on expected flow rates or expected pressure of corresponding fluid sources. Server 402 determines cycle runtimes based on soil capacity, ponding factors, infiltration rate, vegetation type, vegetation density, or other property information. Server 402 uses any maximum allowable flow rate information and pressure sensor information to generate schedules that deliver a target amount of water in runtimes that satisfy any seasonal restrictions, municipal restrictions, cost limitations, or client preferences.

If a central system 150 loses an established communications channel with a fluid delivery controller, upon reestablishing a communications channel with that fluid delivery controller, central system 150 communicates an updated schedule to the fluid delivery controller. By automatically updating schedules in response to reestablishing a communications channel with a fluid delivery controller, fluid delivery management improves in remote locations with unreliable or intermittent communications services and for fluid delivery controllers that routinely lose power and thus routinely lose established communications channels (e.g., in systems where fluid delivery controllers share power supplies with other facilities). In an exemplary embodiment, if a fluid delivery controller loses power while running a schedule and the fluid delivery controller is unable to control valves during an interval (e.g. first thirty minutes of an hour-long schedule), if the fluid delivery controller later regains power, then the fluid delivery controller resumes operation according to that schedule (e.g., delivers the last thirty minutes of the hour-long schedule). Accordingly, fluid delivery schedules are not compromised during loss-of-power events.

In at least one embodiment, central system 150 uses sensor data and flow rate profiling techniques to identify leaks associated with a fluid source or fluid delivery system shortly after a leak occurs, without visual inspection at the property or substantial unexpected increases in fluid usage and costs. Central system 150 monitors a total flow rate for a fluid source or local fluid delivery system and identifies changes in a total fluid flow rate for that fluid source of local fluid delivery system. The duration of those changes in total fluid flow rate and predetermined fluid flow rates stored in database 404 are used to identify potentially leaking appliance types. In at least one embodiment, predetermined fluid flow rate information associated with operation of standard appliances (e.g., a commercial appliance or a consumer appliance) is stored in database 404. An exemplary entry in database 404 includes a predetermined fluid flow rate or predetermined range of fluid flow rates, a predetermined active interval, and an appliance type although other information may be used. For example, a flush of a toilet installed at a property will cause a change in predetermined fluid flow rate of N gpm for a predetermined active interval of M minutes.

Central system 150 tracks a total fluid flow rate for a fluid source or local fluid delivery system and identifies changes to that total fluid flow rate. Central system 150 generates a marker for each change to that total fluid flow rate for that fluid source or local fluid delivery system. An exemplary marker includes metadata that is used for analyzing the changes in total fluid flow rate. Exemplary metadata includes a timestamp for the change, the amount of the change (e.g., in gallons per minute), and estimated active time for an appliance that potentially caused the change.

In at least one embodiment, server 402 analyzes each new marker to determine if the rate change is an increase in total fluid flow rate or a decrease in total fluid flow rate. If the new marker corresponds to a decrease in total fluid flow rate (e.g., in response to an appliance shutting off fluid delivery), server 402 compares metadata of the new marker to metadata of existing markers to identify a possible match (e.g., a marker corresponding to the same appliance turning on fluid delivery) and may remove both markers from a primary group of marker being analyzed. Server 402 updates active times for existing markers. In at least one embodiment, server 402 identifies markers that have been active for an interval longer than an expected interval for a corresponding appliance type associated with a predetermined flow rate change of the same magnitude and generates an alert indicating a potentially leaking appliance type based thereon.

In at least one embodiment, server 402 compares the fluid flow rate change of each marker to the predetermined fluid flow rate changes stored in database 404 and identifies one or more potential appliance types that could have caused the fluid flow rate change. If, based on the amount of the flow rate change, server 402 is unable to identify an appliance that may have caused the fluid flow rate change, central system 150 generates an alert. If, based on the amount of the flow rate change, server 402 identifies at least one appliance that may have caused the fluid flow rate change, server 402 compares the duration of the fluid flow rate change to an expected duration in database 404 that is associated with that appliance type. If the duration of the fluid flow rate change exceeds the expected duration for that appliance type and an inverse event having the same magnitude of flow rate change but in the opposite direction has not occurred, server 402 generates an alert indicating a potentially leaking appliance type.

Figure 14:
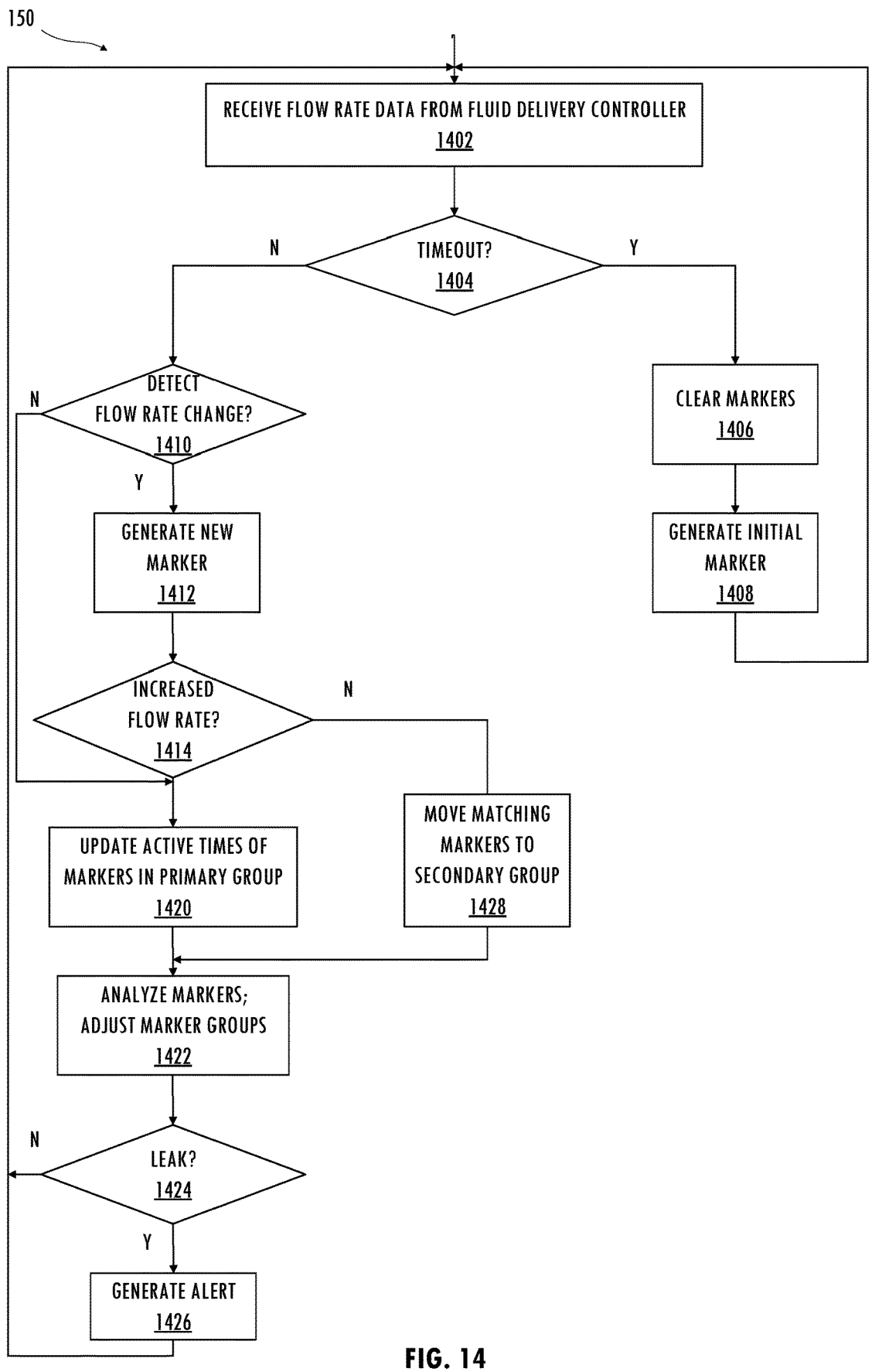
FIG. 14 is a flowchart illustrating exemplary information and control flows for identifying potentially leaking appliance types in a fluid delivery system consistent with at least one embodiment of the invention.

In at least one embodiment, central system 150 profiles flow rate data received from a fluid delivery controller to identify potentially leaking appliances associated with a fluid source or a property consistent with the information and control flows of FIG. 14. Central system 150 receives flow rate data for the fluid source or property from a fluid delivery controller (1402). If more than a predetermined amount of time has elapsed since a most recent, prior receipt of flow rate data (1404), server 402 times out the profiling analysis, clears any existing markers (1406), and generates an initial flow rate marker and initializes a stored total flow rate with the received flow rate (1408). Otherwise, central system 150 maintains any existing markers and continues profiling flow rate data. Server 402 compares a total flow rate stored in database 404 to a received total flow rate. If the magnitude of the difference between the received total flow rate and a stored total flow rate exceeds a predetermined amount, then server 402 detects a change in the total flow rate (1410). If central system 150 does not detect a change in the total flow rate (1410), then server 404 updates active times of markers in a primary group of markers for the property or fluid source (1420). If central system 150 detects a change in the total flow rate, then server 402 generates a new marker and associated metadata (1412).

If a new marker is associated with an increase in the flow rate (1414), then server 402 updates the estimated active time for any existing markers in a primary group (1420). If the new marker is associated with a decrease in the flow rate (1414), and server 402 identifies at least one opposing marker having approximately equal magnitude, but opposite change (e.g., an increase) in the total flow rate, then central system 150 moves the new marker and the opposing marker(s) (e.g., increases of the same magnitude) from the primary group of markers and into a secondary group of markers (1428). Server 402 analyzes the primary group of markers to identify potential leaks and determines the stored total flow rate based on the sum of the initial flow rate and changes associated with the primary group of markers (1422). In at least one embodiment, central system 150 compares the received total flow rate with the stored total flow rate and if they are unequal, server 402 adds or removes markers from the primary and secondary groups and updates the stored total flow rate accordingly, until the received total flow rate equals the stored total flow rate. If central system 150 identifies a potential leak based on comparison of marker active times to predicted durations for corresponding application types (1424), server 402 will generate an alert including information associated with the potential leak (e.g., type of appliance suspected of leakage, location, size of leak, or other information) (1426). If server 402 does not identify any potential leaks during an interval (1424), server 402 may send a report to a client indicating that no potential leaks are currently identified and continues to profile received flow data or may continue to profile received flow data without reporting to a user.

Thus, techniques for managing delivery of water or other fluids have been disclosed. A central server provides real-time data and cost analysis to a client. In addition, fluid delivery techniques provide alerts or automatic schedule suspensions to reduce risk of loss. The techniques reduce or eliminate the impact of the air or gas captured with water or other fluid in a fluid delivery system. The techniques allow a preexisting fluid delivery system to be retrofitted to communicate with a central system and one or more sensors of a fluid delivery system.

In at least one embodiment, a method for operating a liquid delivery system includes testing the liquid delivery system for leaks and generating a leak indicator based thereon. The method includes, prior to the testing, releasing gas from a mainline of the liquid delivery system. In at least one embodiment, the releasing includes closing a master valve between the mainline and a fluid source, after closing the master valve, opening a zone control valve connected between the mainline and a zone line, and after opening the zone control valve, opening the master valve to fill the mainline with a liquid to reach a fully charged state of the mainline. In at least one embodiment, the testing includes, after the mainline reaches the fully charged state, closing the zone control valve while the master valve remains open, and determining a flow rate of the liquid in the mainline after closing the zone control valve. In at least one embodiment, the testing includes generating the leak indicator based on the flow rate and a predetermined threshold flow rate.

In at least one embodiment, the method includes generating an alert indicating a risk of leaks in the liquid delivery system in response to a determination of whether valves in the liquid delivery system are communicatively coupled to a central system. In at least one embodiment, the method includes selectively suspending a predetermined schedule for liquid delivery based on the leak indicator. In at least one embodiment, the method includes detecting an event in the liquid delivery system, identifying a corresponding type of the event as a leak event type or a non-leak event type, and adjusting execution of a predetermined program for operating the liquid delivery system in response to detecting the event and the corresponding type being the leak event type. In at least one embodiment, the adjusting includes disabling the liquid delivery system based on detection of the event and the corresponding type being the leak event type. In at least one embodiment, the method includes maintaining the execution of the predetermined program based on detection of the event and the corresponding type being the non-leak event type. In at least one embodiment, the method includes communicating metadata to a central system, receiving sensor data from a sensor in the mainline, and converting the sensor data from a sensor interface format selected from a plurality of sensor interface formats to the metadata.

In at least one embodiment, a liquid delivery system includes a system controller, a mainline selectively coupled to a liquid source using a master valve, a flow meter in the mainline and communicatively coupled to the system controller, and the master valve. The master valve is disposed between the mainline and a utility fluid line at an inlet to the mainline. The master valve is communicatively coupled to the system controller. The system controller is configured to generate control signals for the master valve to test the liquid delivery system for leaks, generate a leak indicator based on a signal received from the flow meter, and release gas from the mainline prior to the test. In at least one embodiment, the system controller includes a storage element configured to store instructions and a processor configured to execute the instructions. The instructions are executable by the processor to cause the processor to generate the control signals. In at least one embodiment, the control signals are configured to close the master valve, open a zone control valve connected between the mainline and a zone line after the master valve closes, and open the master valve to fill the mainline with a liquid to reach a fully charged state of the mainline after the zone control valve opens.

In at least one embodiment, the control signals are configured to close a zone control valve while the master valve remains open after the mainline reaches a fully charged state and determine a flow rate of a liquid in the mainline after the zone control valve closes. In at least one embodiment, the system controller is configured to generate the leak indicator based on the flow rate of the liquid and a predetermined threshold flow rate.

In at least one embodiment, the liquid delivery system further includes a zone line and a zone control valve between the mainline and the zone line. In at least one embodiment, the system controller is configured to generate an alert indicating a risk of leaks in the liquid delivery system in response to a determination of whether valves in the liquid delivery system are communicatively coupled to a central system.

In at least one embodiment, the system controller is configured to detect an event in the liquid delivery system, identify a corresponding type of the event as a leak event type or a non-leak event type, and adjust execution of a predetermined program for operating the liquid delivery system in response to detecting the event and the corresponding type being the leak event type. In at least one embodiment, the system controller is further configured to disable the liquid delivery system in response to detecting the event and the corresponding type of the event being the leak event type. In at least one embodiment, the system controller is further configured to detect an event in the liquid delivery system, identify a corresponding type of the event as a leak event type or a non-leak event type, and maintain scheduled operation of the liquid delivery system in response to detecting the event and the corresponding type being the non-leak event type.

In at least one embodiment, the liquid delivery system further includes a fluid flow rate sensor in the mainline, a fluid pressure sensor in the mainline, or a precipitation sensor proximate to the mainline. In at least one embodiment, the liquid delivery system further includes an interface device comprising a controller, a wireless interface coupled to the controller and configured to communicate metadata to a central system, a sensor interface configured to receive sensor data from a sensor in the mainline or in a zone line, and a plurality of local system controller interfaces. In at least one embodiment, a first local system controller interface of the plurality of local system controller interfaces is selected to be communicatively coupled to the system controller and the controller is configured to convert the sensor data from a sensor interface format to the metadata. In at least one embodiment, the metadata includes pressure data and flow rate data.

In at least one embodiment, a fluid delivery system includes a central system controller comprising: a database configured to store flow data, cost data, user data, leak data, alarm data, property configurations, rate information, and historical rate information for a local fluid delivery system, a rate engine configured to generate fluid usage cost information for the local fluid delivery system based on contents of the database, and a server configured to provide reports and notifications based on the fluid usage cost information to a client using a user interface.

In at least one embodiment, a method for operating a fluid delivery system includes detecting a leak in the fluid delivery system, notifying a user of the leak, and providing the user with cost savings information associated with notifying the user of the leak based on flow data, cost data, user data, leak data, alarm data, property configurations, rate information, and historical rate information for a local fluid delivery system.

In at least one embodiment, a method for operating a fluid delivery system includes detecting a leak in the fluid delivery system by a central system communicatively coupled to the fluid delivery system, estimating a flow rate of the leak by the central system based on sensor data received from the fluid delivery system, estimating a time-to-detection of the leak by the central system, estimating a time-to-fix the leak after detecting the leak by the central system, generating a cost savings estimate based on the flow rate, the time-to-detection, the time-to-fix, and stored fluid usage rate information by the central system, and displaying the cost savings estimate on a client interface associated with the fluid delivery system.

In at least one embodiment, a method for operating a fluid delivery system includes detecting a leak in the fluid delivery system by a central system coupled to the fluid delivery system based on metadata received from the fluid delivery system, generating a cost savings estimate based on an estimated flow rate of the leak, an estimated time to detect the leak, a second estimated time to fix the leak, and stored fluid usage rate information, and providing the cost savings estimate to a client interface associated with the fluid delivery system.

In at least one embodiment, a method for operating a fluid delivery system includes detecting an unscheduled fluid usage by a central system communicatively coupled to the fluid delivery system based on metadata received from the fluid delivery system, and determining whether the unscheduled fluid usage is a leak or a theft based on flow rate of the unscheduled fluid usage, time of the unscheduled fluid usage, and duration of the unscheduled fluid usage. In at least one embodiment, the method includes storing flow data, cost data, user data, leak data, alarm data, property configurations, rate information, and historical rate information for the fluid delivery system in the central system. In at least one embodiment, the method includes estimating, by the central system, a fluid usage cost associated with the unscheduled fluid usage. In at least one embodiment, the method includes providing an alert by the central system to a user associated with the fluid delivery system based on detection of the unscheduled fluid usage. In at least one embodiment, the method includes projecting, by the central system, a cost savings based on a time of detection of the unscheduled fluid usage and an estimate of additional unscheduled fluid usage had the alert not been provided to the user. In at least one embodiment, the method includes suspending, by the central system, scheduled fluid usage of the fluid delivery system based on detection of the unscheduled fluid usage.

In at least one embodiment, the method includes periodically collecting rate information from a fluid provider by the central system and storing a snapshot of the rate information for the fluid provider in a utility shadowing data structure. In at least one embodiment, the method includes periodically collecting fluid flow information from a sensor in the fluid delivery system by the central system and storing the fluid flow information and corresponding date information for an identified property in a fluid usage data structure. In at least one embodiment, the method includes periodically determining, by the central system, a scheduled fluid usage of the fluid delivery system, and determining, by the central system, a cost of the scheduled fluid usage of the fluid delivery system. In at least one embodiment, the method includes periodically determining, by the central system, manual fluid usage of the fluid delivery system, and determining, by the central system, a cost of the manual fluid usage of the fluid delivery system. In at least one embodiment, the method includes periodically determining, by the central system, the unscheduled fluid usage of the fluid delivery system. In at least one embodiment, the method includes determining, by the central system, a cost of any unscheduled fluid usage of the fluid delivery system. In at least one embodiment, the method includes generating, by the central system, a time-span cost of fluid used by the fluid delivery system based on the utility shadowing data structure and the fluid usage data structure.

In at least one embodiment, a method for operating a fluid delivery system includes estimating, by a central system communicatively coupled to the fluid delivery system, an estimated cost of fluid delivery for each of a plurality of fluid supplies coupled to the fluid delivery system, and selecting, by the central system, a first fluid supply of the plurality of fluid supplies for fluid delivery based on a corresponding priority for each of the plurality of fluid supplies. In at least one embodiment, the method includes selecting, by the central system, a second fluid supply of the plurality of fluid supplies for the fluid delivery based on updates to the corresponding priority for each of the plurality of fluid supplies. In at least one embodiment of the method, the corresponding priority for each of the plurality of fluid supplies is based on cost estimate information for amount of fluid used by the fluid delivery system over a period of time. In at least one embodiment, the method includes communicating a fluid supply selected for fluid delivery from a central system controller to an interface controller coupled to a local irrigation controller. In at least one embodiment of the method, the local irrigation controller controls a valve for each of the plurality of fluid supplies coupled to a mainline of the fluid delivery system based on a signal received from the central system controller via the interface controller.

In at least one embodiment, a method for operating a fluid delivery system includes sensing a first fluid pressure in a mainline, sensing a second fluid pressure in each of a plurality of zone lines, and selectively opening the corresponding zone control valve based on a corresponding fluid pressure in each of the plurality of zone lines and a predetermined fluid pressure threshold. Each of the plurality of zone lines is coupled to the mainline using a corresponding zone control valve. In at least one embodiment, the method includes selectively closing the corresponding zone control valve based on the corresponding fluid pressure and the predetermined fluid pressure threshold. In at least one embodiment, the corresponding zone control valve is selectively opened further based on a target fluid throughput schedule.

In at least one embodiment, a fluid delivery system includes an interface device comprising: a controller, a wireless interface coupled to the controller and configured to communicate metadata to a central system controller, a sensor interface configured to receive sensor data from a sensor in a mainline or in a zone line of the fluid delivery system, and a plurality of local system controller interfaces. A first local system controller interface of the plurality of local system controller interfaces is selected to be communicatively coupled to a local system controller. The local system controller is configured to convert the sensor data from a sensor interface format to the metadata. In at least one embodiment, the metadata includes pressure data and flow rate data. In at least one embodiment, the controller executes a sensor thread and periodically polls the sensor interface for received sensor data. In at least one embodiment, the sensor interface is coupled to the sensor using a first transmission line. In at least one embodiment, the fluid delivery system further includes a pressure sensor in the mainline or in the zone line, and a flow rate sensor in the mainline or in the zone line, and the sensor interface is coupled to the pressure sensor and the flow rate sensor.

In at least one embodiment, the sensor interface comprises a plurality of sensor input channels. In at least one embodiment, at least one of the plurality of sensor input channels accepts contact closure pulse inputs. In at least one embodiment, at least one of the plurality of sensor input channels accepts current inputs in a range of 4-20 milliamperes (mA). In at least one embodiment, at least one of the plurality of sensor input channels accepts voltage signals in a range of 0 Volts-5 Volts. In at least one embodiment, the metadata includes flow information, time of flow information, and location information for the flow information. In at least one embodiment, the sensor is a precipitation sensor proximate to the mainline. In at least one embodiment, the sensor is a flow rate sensor in the mainline or in the zone line. In at least one embodiment, the sensor is a pressure sensor in the mainline or in the zone line. In at least one embodiment, the first local system controller interface is coupled to the local system controller using a transmission line. In at least one embodiment, the fluid delivery system further includes the central system controller comprising: a database, and a processor configured to provide a notification service, a scheduling service, and a reporting service to a client associated with the fluid delivery system. In at least one embodiment, the local system controller is coupled to a zone control valve in the zone line coupled to a master valve. In at least one embodiment, the local system controller is configured to send flow data to the interface device via a transmission line.

In at least one embodiment, a method for operating an interface in a fluid delivery system includes converting sensor data from a first format of a sensor interface to metadata. The sensor interface is a first interface type of a plurality of sensor interface types supported by the interface and the method further includes communicating the metadata using a wireless communications interface. In at least one embodiment the metadata includes pressure data and flow rate data. In at least one embodiment, the plurality of sensor interface types includes a 4-20 mA sensor input.

In at least one embodiment, a fluid delivery system includes a plurality of interface devices. Each of the plurality of interface devices includes a controller, a wireless interface coupled to the controller, a wireline interface coupled to the controller and configured to communicate metadata to another interface device of the plurality of interface devices via a transmission line, a sensor interface configured to receive sensor data, and a plurality of local system controller interfaces. The controller is configured to convert the sensor data from sensor interface format to a metadata format. Each of the plurality of interface devices is communicatively coupled in series to another interface device of the plurality of interface devices. A first interface device of the plurality of interface devices is communicatively coupled to a valve of the fluid delivery system and a sensor via additional transmission lines. A second interface device of the plurality of interface devices is communicatively coupled to a central system via the wireless interface of the second interface device.

In at least one embodiment, a method for managing a fluid delivery system includes detecting changes in a flow rate of the fluid delivery system based on received total flow rates received from the fluid delivery system and identifying a potential leak in the fluid delivery system associated with the changes based on durations of the changes, flow rates of the changes, and predetermined flow rate information for types of appliances coupled to the fluid delivery system. In at least one embodiment, the predetermined flow rate information comprises a plurality of predetermined flow rate change amounts, corresponding expected durations, and corresponding appliance types.

In at least one embodiment, a method for managing a fluid delivery system includes analyzing a plurality of markers. Each marker of the plurality of markers is generated in response to detecting a change in received total flow rate of the fluid delivery system. The method includes identifying a potentially leaking appliance type based on metadata associated with the plurality of markers and a plurality of predetermined flow rate changes and associated appliance types. In at least one embodiment, the method includes allocating markers of the plurality of markers to a secondary group of markers from a primary group of markers based on magnitudes of corresponding flow rate changes and directions of corresponding flow rate changes. In at least one embodiment, the magnitudes of corresponding flow rate changes are the same. In at least one embodiment, the method includes reallocating a marker of the secondary group of markers to the primary group of markers based on the received total flow rate and a total flow rate associated with the markers in the primary group of markers. In at least one embodiment, metadata of each marker includes a timestamp, a duration, and a flow rate associated with a corresponding change in flow rate. In at least one embodiment, the method includes, in response to identifying the potentially leaking appliance type, sending an alert indicating the potentially leaking appliance type.

In at least one embodiment, an apparatus includes means for storing a plurality of markers, each marker of the plurality of markers generated in response to detecting a change in flow rate of a fluid delivery system, and means for identifying a potentially leaking appliance type based on metadata associated with the plurality of markers and a plurality of predetermined flow rate changes and associated appliance types.

In at least one embodiment, a method for operating a fluid delivery system includes receiving local environmental data by a central system from a fluid delivery controller, periodically polling, by the central system, remote weather data sources for remote weather data, generating, by the central system, a fluid delivery schedule based on the local environmental data, the remote weather data, and target water delivery information, and communicating the fluid delivery schedule from the central system to the fluid delivery controller. In at least one embodiment, the method includes regenerating the fluid delivery schedule by the central system in response to re-establishing communication with the fluid delivery controller after a loss of communication with the fluid delivery controller, and communicating a regenerated fluid delivery schedule from the central system to the fluid delivery controller.

In at least one embodiment, an apparatus includes means for storing local environmental data received from a fluid delivery controller and remote weather data received periodically from remote weather data sources, and means for generating a fluid delivery schedule based on the local environmental data, the remote weather data, and target water delivery information.

The description of the invention set forth herein is illustrative and is not intended to limit the scope of the invention as set forth in the following claims. For example, while the invention has been described in an embodiment in which a water delivery system is described, one of skill in the art will appreciate that the teachings herein can be utilized with other fluid delivery systems. The terms "first," "second," "third," and so forth, as used in the claims, unless otherwise clear by context, is to distinguish between different items in the claims and does not otherwise indicate or imply any order in time, location or quality. For example, "a first received network signal," "a second received network signal," does not indicate or imply that the first received network signal occurs in time before the second received network signal. Software (including firmware), as described herein, may be encoded in at least one tangible (i.e., non-transitory) computer readable medium. As referred to herein, a tangible computer-readable medium includes at least a disk, tape, or other magnetic, optical, or electronic storage medium. Variations and modifications of the embodiments disclosed herein may be made based on the description set forth herein, without departing from the scope of the invention as set forth in the following claims.

What is claimed is:

1. A method for operating a liquid delivery system comprising:
   closing a master valve between a mainline of the liquid delivery system and a liquid source;
   opening a zone control valve connected between the mainline and a zone line of the liquid delivery system while the master valve is closed;
   opening the master valve to fill the mainline with a liquid to reach a fully charged state of the mainline while the zone control valve is open;
   closing the zone control valve in response to the mainline reaching the fully charged state; and
   determining a flow rate of the liquid in the mainline while the zone control valve is closed and the master valve remains open and generating a leak indicator based thereon.

2. The method as recited in claim 1, wherein the leak indicator is generated further based on a predetermined threshold flow rate.

3. The method as recited in claim 1, further comprising:
   generating an alert indicating a risk of leaks in the liquid delivery system in response to a determination of whether valves in the liquid delivery system are communicatively coupled to a central system.

4. The method as recited in claim 1, further comprising:
   selectively suspending a predetermined schedule for liquid delivery based on the leak indicator.

5. The method as recited in claim 1, further comprising:
   detecting an event in the liquid delivery system;
   identifying a corresponding type of the event as a leak event type or a non-leak event type; and
   in response to detection of the event, disabling the liquid delivery system in response to the corresponding type being the leak event type or maintaining execution of a predetermined program by the liquid delivery system in response to the corresponding type being the non-leak event type.

6. The method as recited in claim 1, further comprising:
   communicating metadata to a central system;
   receiving sensor data from a sensor in the mainline; and
   converting the sensor data from a sensor interface format selected from a plurality of sensor interface formats to the metadata.

7. A liquid delivery system comprising:
   a system controller;
   a mainline selectively coupled to a liquid source using a master valve;
   a flow meter in the mainline and communicatively coupled to the system controller; and
   the master valve between the mainline and a utility fluid line at an inlet to the mainline, the master valve being communicatively coupled to the system controller,
   wherein the system controller is configured to generate control signals to open a zone control valve connected between the mainline and a zone line, to fill the mainline with a liquid to reach a fully charged state of the mainline while the zone control valve is open, and to close the zone control valve in response to the mainline reaching the fully charged state, and configured to generate a leak indicator based on a signal received from the flow meter while the zone control valve is closed and the master valve is open.

8. The liquid delivery system as recited in claim 7, wherein the system controller comprises:
   a storage element configured to store instructions; and
   a processor configured to execute the instructions,
   wherein the instructions are executable by the processor to cause the processor to generate the control signals.

9. The liquid delivery system as recited in claim 7, wherein the control signals are configured to:
   close the master valve before the zone control valve opens, and
   open the master valve to fill the mainline with the liquid to reach the fully charged state of the mainline while the zone control valve is open.

10. The liquid delivery system as recited in claim 7, wherein the system controller is configured to:
    determine a flow rate of a liquid in the mainline while the zone control valve is closed.

11. The liquid delivery system as recited in claim 10, wherein the system controller is configured to generate the leak indicator based on the flow rate of the liquid and a predetermined threshold flow rate.

12. The liquid delivery system as recited in claim 7, further comprising:
    the zone line; and
    the zone control valve between the mainline and the zone line,
    wherein the system controller is configured to generate an alert indicating a risk of leaks in the liquid delivery system in response to a determination of whether valves in the liquid delivery system are communicatively coupled to a central system.

13. The liquid delivery system as recited in claim 7, wherein the system controller is configured to:
    detect an event in the liquid delivery system;
    identify a corresponding type of the event as a leak event type or a non-leak event type; and adjust execution of a predetermined program for operating the liquid delivery system in response to detecting the event and the corresponding type being the leak event type.

14. The liquid delivery system as recited in claim 13, wherein the system controller is further configured to:
disable the liquid delivery system in response to detecting the event and the corresponding type of the event being the leak event type.

15. The liquid delivery system as recited in claim 7, wherein the system controller is further configured to:
detect an event in the liquid delivery system;
identify a corresponding type of the event as a leak event type or a non-leak event type; and
maintain scheduled operation of the liquid delivery system in response to detecting the event and the corresponding type being the non-leak event type.

16. The liquid delivery system as recited in claim 7, further comprising:
a fluid flow rate sensor in the mainline, a fluid pressure sensor in the mainline, or a precipitation sensor proximate to the mainline.

17. The liquid delivery system as recited in claim 7, further comprising:
an interface device comprising:
a controller;
a wireless interface coupled to the controller and configured to communicate metadata to a central system;
a sensor interface configured to receive sensor data from a sensor in the mainline or in the zone line; and
a plurality of local system controller interfaces,
wherein a first local system controller interface of the plurality of local system controller interfaces is selected to be communicatively coupled to the system controller,
wherein the controller is configured to convert the sensor data from a sensor interface format to the metadata,
wherein the metadata includes pressure data and flow rate data.

18. A liquid delivery system comprising:
a mainline selectively coupled to a liquid source using a master valve;
a zone line selectively coupled to the mainline using a zone control valve;
a sensor configured to measure flow rate of liquid in the mainline; and
means for releasing gas from the mainline using the zone line by closing the master valve and opening the zone control valve, filling the mainline to a fully-charged state by opening the master valve while the zone control valve is open, and generating a leak indicator by closing the zone control valve and using information measured by the sensor while the mainline is in the fully-charged state.

* * * * *